(12) United States Patent
Murakami et al.

(10) Patent No.: US 7,123,400 B2
(45) Date of Patent: Oct. 17, 2006

(54) LIGHT DEFLECTOR

(75) Inventors: Kenzi Murakami, Hino (JP);
Yoshitaka Kamiya, Hachioji (JP);
Hiroshi Miyajima, Hachioji (JP); Yujin Arai, Tokyo (JP)

(73) Assignee: Olympus Corporation, Tokyo (JP)

( * ) Notice: Subject to any disclaimer, the term of this patent is extended or adjusted under 35 U.S.C. 154(b) by 32 days.

(21) Appl. No.: 10/975,882

(22) Filed: Oct. 28, 2004

(65) Prior Publication Data

US 2005/0094296 A1    May 5, 2005

(30) Foreign Application Priority Data

Oct. 30, 2003    (JP)    ............................. 2003-370900

(51) Int. Cl.
*G02B 26/08*    (2006.01)
(52) U.S. Cl. ........................ 359/298; 359/290; 359/291
(58) Field of Classification Search ................ 359/298, 359/223, 224, 290, 291
See application file for complete search history.

(56) References Cited

U.S. PATENT DOCUMENTS 5,543,956 A    8/1996  Nakagawa et al. ......... 359/225
6,067,133 A *  5/2000  Niibori et al. ................. 349/60
2002/0118429 A1  8/2002  Miyajima et al. ............ 359/224
2003/0042801 A1  3/2003  Miyajima et al. ............. 310/36
2005/0162722 A1*  7/2005  Harris ......................... 359/198

FOREIGN PATENT DOCUMENTS

| EP | 0 620 415 A1 | 10/1994 |
| JP | 2849697 | 11/1998 |
| JP | 3003429 | 11/1999 |
| WO | WO 02/099504 A2 | 12/2002 |

* cited by examiner

*Primary Examiner*—Timothy Thompson
*Assistant Examiner*—Jerry Fang
(74) *Attorney, Agent, or Firm*—Scully, Scott, Murphy & Presser, P.C.

(57)    ABSTRACT

A light deflector comprises a first movable plate having a reflective surface, fixing portions, a pair of second movable plates located between the first movable plate and the fixing portions, a pair of first elastic members supporting the first movable plate so as to allow it to oscillate with respect to the second movable plates, a pair of second elastic members supporting the second movable plates so as to allow them to oscillate with respect to the fixing portions, and an actuator to oscillate the first movable plate. Oscillation axis of the first elastic members and oscillation axis of the second elastic members are located on the same axis. Stiffness of the second elastic members against oscillation is lower than stiffness of the first elastic members against oscillation.

14 Claims, 14 Drawing Sheets

LIGHT DEFLECTOR

CROSS-REFERENCE TO RELATED APPLICATIONS

This application is based upon and claims the benefit of priority from the prior Japanese Patent Application No. 2003-370900, filed Oct. 30, 2003, the entire contents of which are incorporated herein by reference.

BACKGROUND OF THE INVENTION

1. Field of the Invention

The present invention relates to a light deflector manufactured by applying a semiconductor manufacturing process technique.

2. Description of the Related Art

Recently, attention has been directed to a light deflector manufactured by applying a semiconductor manufacturing process technique, i.e., a light deflector manufactured by applying MEMS technology. A light deflector that oscillates at a resonant frequency is disclosed in, for example, U.S. 2002/118429.

This light deflector comprises a movable plate having a reflective surface, a pair of torsion bars supporting the movable plate so as to allow it to oscillate, and a supporting member holding the torsion bars. The movable plate has a first portion having the reflective surface, and a second portion having electric elements that constitute part of actuating means to actuate a mirror oscillating member. The first portion has a reflective surface forming surface in which the reflective surface is formed, and the second portion has an electric element forming surface in which the electric elements are-formed. The reflective surface forming surface is smaller than the electric element forming surface, and has a shape such as an elliptic shape substantially inscribed in a rectangle of the electric element forming surface. An electromagnetically actuating method is employed, and the electric element is a drive coil going around the edge of the movable plate. This drive coil is disposed in a space having magnetic flux perpendicular to an oscillation axis, and oscillates the movable plate by a Lorentz force caused by passing an electric current through the drive coil.

In this light deflector, the area of the second portion is made smaller than that of the first portion configuring the movable plate so that the moment of inertia of the movable plate is reduced while the size of the movable plate and the dynamic flatness of the movable plate are maintained. As a result, the stiffness of the torsion bar can be reduced while maintaining a constant resonant frequency, thereby allowing actuating efficiency to be improved. Thus, the overall actuating efficiency is improved while maintaining the resonant frequency and mirror performance.

In a present application using a light deflector, a light deflector that manages both high-speed scanning and low-speed scanning is desired. More specifically, a light deflector is desired that can change an actuating frequency within a predetermined region in the low-speed scanning and that can actuate at a constant frequency higher than a low-speed scanning region in the high-speed scanning. It is naturally preferable that the low-speed scanning region may be wide and that the difference between the high speed and the low speed may be large.

BRIEF SUMMARY OF THE INVENTION

A light deflector of the present invention comprises: a first movable plate having a reflective surface; fixing portions; a pair of second movable plates located between the first movable plate and the fixing portions; a pair of first elastic members supporting the first movable plate so as to allow the first movable plate to oscillate with respect to the second movable plates; a pair of second elastic members supporting the second movable plates so as to allow the second movable plates to oscillate with respect to the fixing portions; and actuating means for oscillating the first movable plate. Oscillation axis of the first elastic members and oscillation axis of the second elastic members are located on the same axis. Stiffness of the second elastic members against oscillation is lower than stiffness of the first elastic members against oscillation.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will hereinafter be described in reference to the drawings.

First Embodiment

Figure 1:
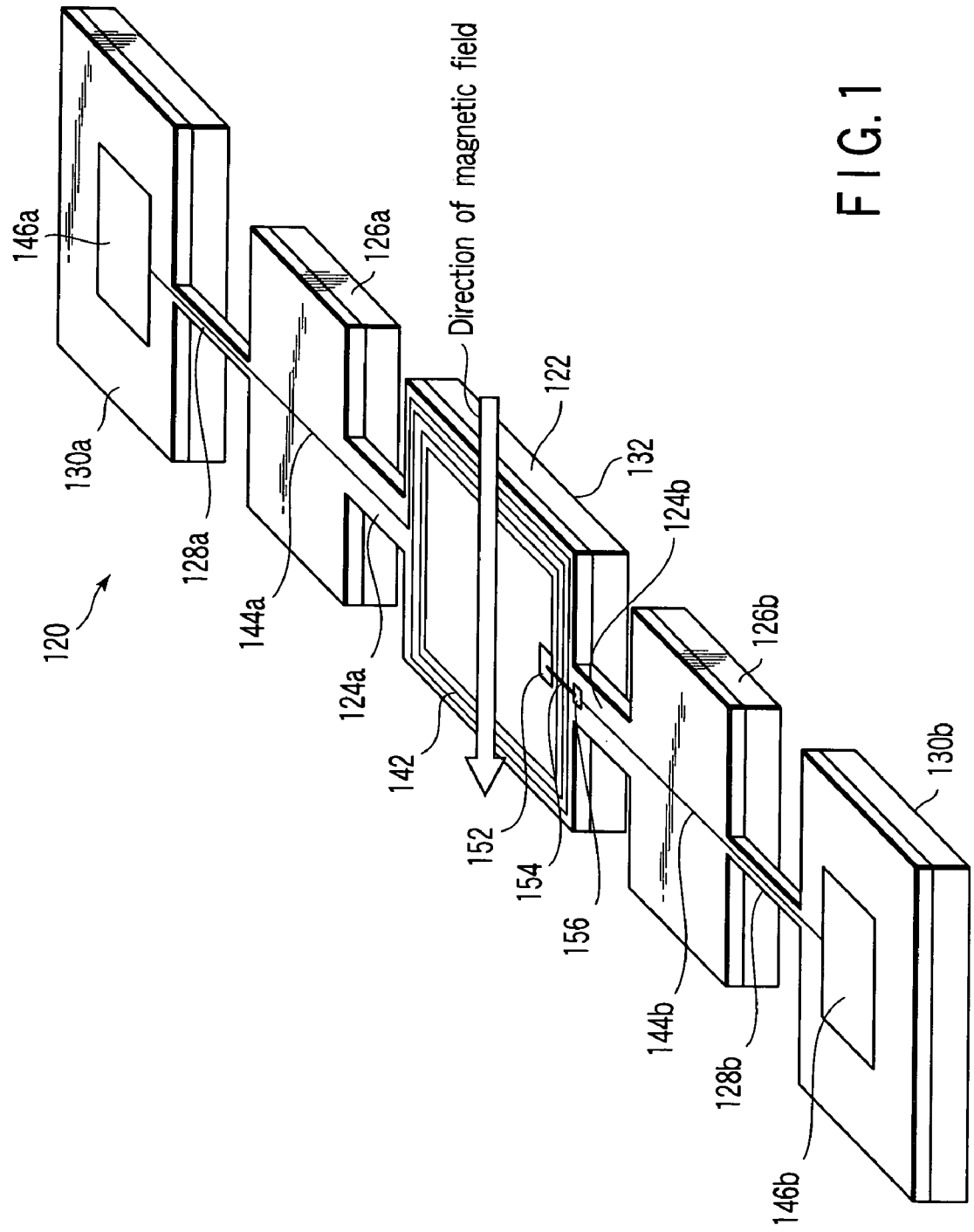
FIG. 1 is a perspective view of essential parts of a light deflector in a first embodiment of the present invention.
Figure 2:
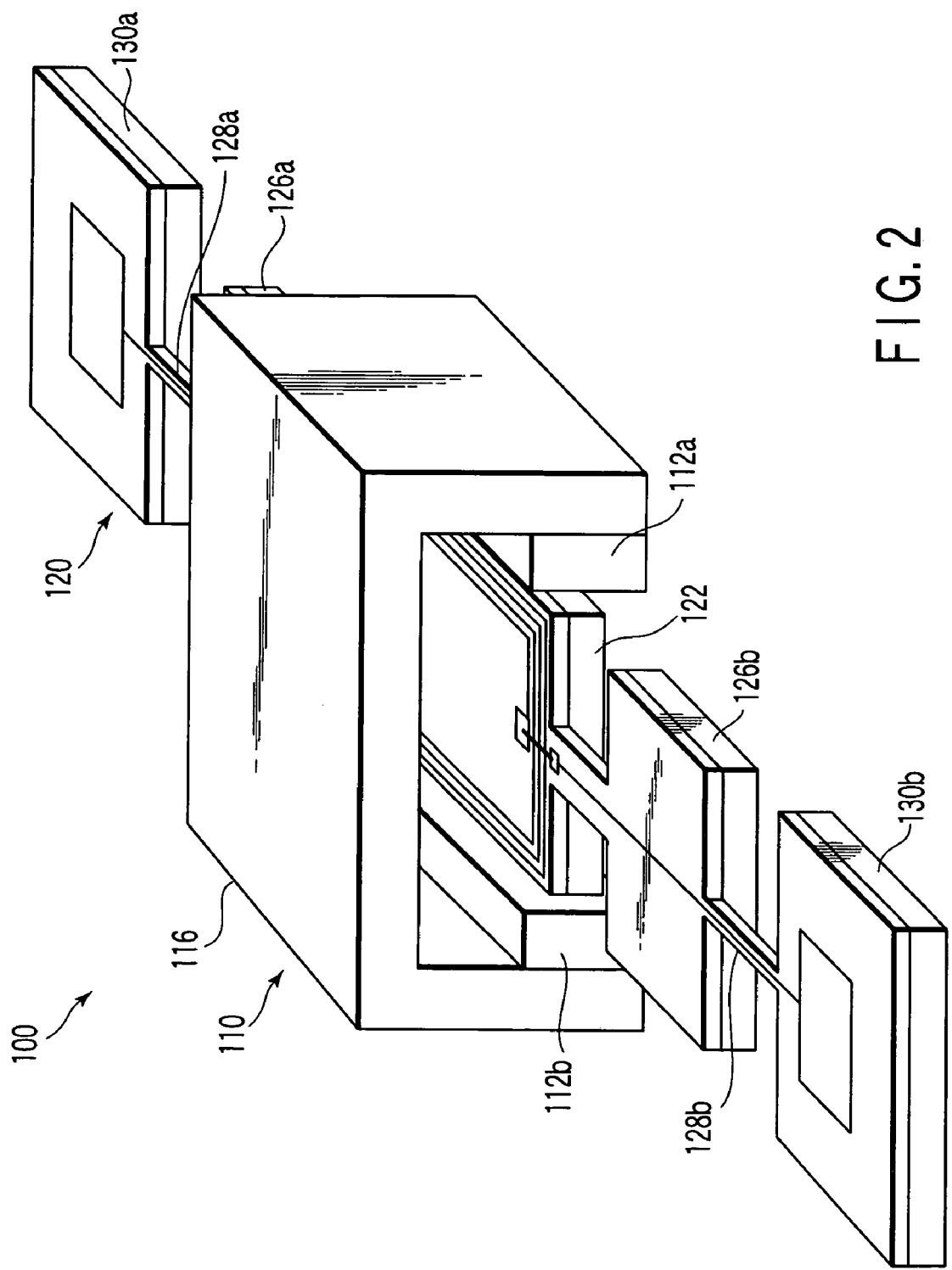
FIG. 2 is a perspective view of the entire light deflector in the first embodiment of the present invention.
Figure 3:
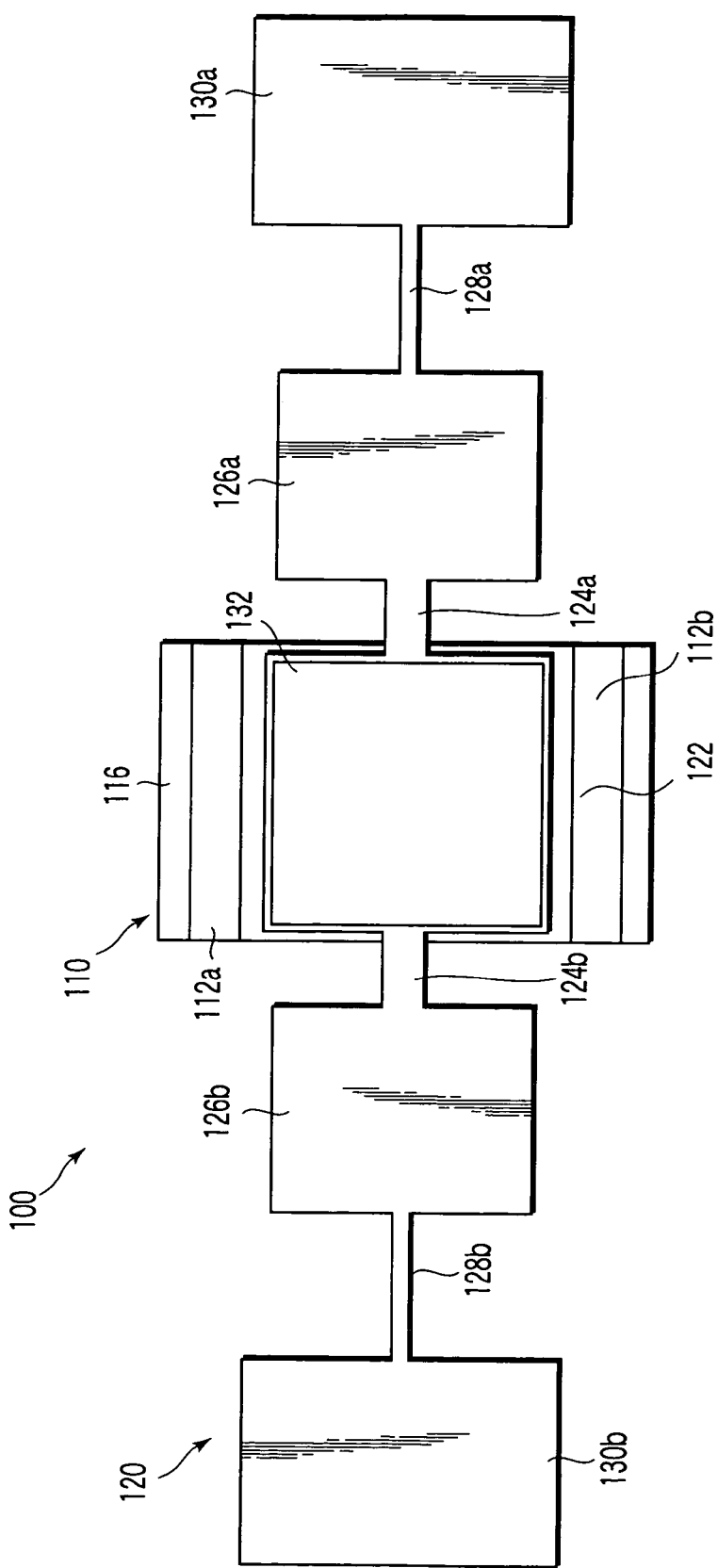
FIG. 3 is a top view of the light deflector shown in FIG. 2.

FIG. 1 is a perspective view of essential parts of a light deflector in a first embodiment of the present invention. FIG. 2 is a perspective view of the entire light deflector in the first embodiment of the present invention. FIG. 3 is a plan view of the light deflector shown in FIG. 2.

As shown in FIG. 1 to FIG. 3, a light deflector 100 in the present embodiment has a first movable plate 122, a pair of second movable plates 126a and 126b located on both sides of the first movable plate 122, a pair of first hinges (torsion bar hinges) 124a and 124b connecting the second movable plates 126a and 126b to the first movable plate 122, a pair of fixing portions 130a and 130b located outside the second movable plates 126a and 126b, and a pair of second hinges 128a and 128b connecting the second movable plates 126a and 126b to the fixing portions 130a and 130b, respectively.

The fixing portions 130a and 130b are configured with separate members in the present embodiment, but are not limited thereto, and may be formed with one member. That is, the fixing portions 130a and 130b may be, for example, part of a member having a frame shape such as a U-shape or square shape that extends around the first movable plate 122 and the second movable plates 126a and 126b.

The first movable plate 122 has a reflective surface 132 on one of main surfaces. Here, the main surfaces of the first movable plate 122 represent the two largest parallel planes, that is, an upper surface and a lower surface in FIG. 1. Moreover, the upper surface and the lower surface represent the upper visible surface and the invisible hidden surface on a rear side, respectively, in FIG. 1. In other words, the first movable plate 122 has the reflective surface 132 on its lower surface.

The first hinges 124a and 124b and the second hinges 128a and 128b are both made of a torsionally deformable elastic material, so that the first movable plate 122 can oscillate with respect to the second movable plates 126a and 126b, and the second movable plates 126a and 126b can oscillate with respect to the fixing portions 130a and 130b.

In the present specification, the term "oscillate" basically refers to repetitive reciprocating vibration about a predetermined virtual axis, but also includes simple inclination about the predetermined virtual axis. Thus, for example, oscillating of the movable plate means that the movable plate inclines or repetitively vibrates about an axis. In addition, the predetermined virtual axis in the oscillating operation will hereinafter be called an oscillation axis.

The oscillation axis of the first hinges 124a and 124b and the oscillation axis of the second hinges 128a and 128b are located on the same axis, and the stiffness of the second hinges 128a and 128b against oscillation is lower than the stiffness of the first hinges 124a and 124b against oscillation.

A structure comprising the first movable plate 122, the first hinges 124a and 124b, the second movable plates 126a and 126b, the second hinges 128a and 128b and the fixing portions 130a and 130b will hereinafter be called a movable plate unit 120.

In other words, the movable plate unit 120 has the first movable plate 122 with the reflective surface 132, the pair of fixing portions 130a and 130b located on both sides of the first movable plate 122, the pair of second movable plates 126a and 126b located between the first movable plate 122 and the fixing portions 130a and 130b, the pair of first hinges 124a and 124b supporting the first movable plate 122 so as to allow it to oscillate with respect to the second movable plates 126a and 126b, and the pair of second hinges 128a and 128b supporting the second movable plates 126a and 126b so as to allow-them to oscillate with respect to the fixing portions 130a and 130b.

The movable plate unit 120 further has a drive coil 142 provided in the first movable plate 122, and extraction electrodes 146a and 146b provided on the fixing portions 130a and 130b, respectively. The drive coil 142 goes around near the edge of the first movable plate 122. An outer end of the drive coil 142 is electrically connected to the extraction electrode 146a on the fixing portion 130a via a wire 144a passing the first hinge 124a, the second movable plate 126a and the second hinge 128a.

Furthermore, an inner end of the drive coil 142 is connected to a contact pad 152, and the contact pad 152 is electrically connected to a contact pad 156 provided outside the drive coil 142 via a bridge wire 154, which crosses over the drive coil 142 through an insulating layer. The contact pad 156 is electrically connected to the extraction electrode 146b on the fixing portion 130b via a wire 144b passing the first hinge 124b, the second movable plate 126b and the second hinge 128b.

These electric elements (the drive coil 142, the wires 144a and 144b, etc.) are provided on the upper side of the movable plate unit 120, and are covered with an insulating film, which is not shown in the drawing, except for the extraction electrodes 146a and 146b.

As shown in FIG. 2 and FIG. 3, the light deflector 100 further has a pair of permanent magnets 112a and 112b located on both sides of the first movable plate 122, and a yoke 116 made of a magnetic material supporting the permanent magnets 112a and 112b. The permanent magnets 112a and 112b constitute a magnetic field generator to generate a magnetic field crossing the first movable plate 122. A structure comprising the permanent magnets 112a and 112b and the yoke 116 constitute a magnetic circuit 110.

The permanent magnets 112a and 112b are magnetized in parallel with the main surfaces (the upper surface and the lower surface) of the first movable plate 122 in an un-oscillating state, and produce a magnetic field directed from one side to the other, for example, a magnetic field directed from the permanent magnet 112a to the permanent magnet 112b. The magnetic field produced by the permanent magnets 112a and 112b is substantially vertical to the oscillation axis, and is substantially parallel to the surfaces of the first movable plate 122 in the un-oscillating state.

The drive coil 142 on the first movable plate 122 and the permanent magnets 112a and 112b located on both sides of the first movable plate 122 constitute actuating means or an actuator to oscillate the first movable plate 122.

Figure 4A:
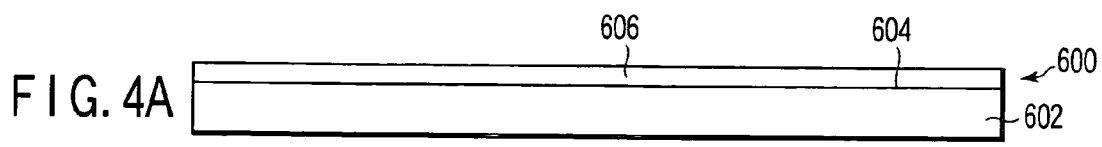
FIG. 4A to FIG. 4H show processes of manufacturing a movable plate unit shown in FIG. 1.

A method of manufacturing the movable plate unit 120 will be described here. FIG. 4A to FIG. 4H show processes of manufacturing the movable plate unit 120. FIG. 5 shows the position of the section shown in FIG. 4A to FIG. 4H. That is, the section shown in FIG. 4A to FIG. 4H is the section of the movable plate unit 120 along the section IV—IV section of FIG. 5.

The movable plate unit 120 is manufactured by MEMS manufacturing technology using a SOI wafer. FIG. 4A shows a SOI wafer 600. The SOI wafer 600 is a substrate in which two layers of silicon substrates 602 and 606 are affixed via a bonding layer 604 which is an insulating layer. The two layers of silicon substrates 602 and 606 both comprise substrates having a specific resistance of about 5 Ωcm used for ordinary semiconductor manufacture. The bonding layer 604, which has a thickness of about 1 μm, comprises a silicon oxide film. Here, the silicon substrate 606 located on the upper side of the drawing is called a device layer, and the silicon substrate 602 located on the lower side is called a handle layer.

Figure 4B:
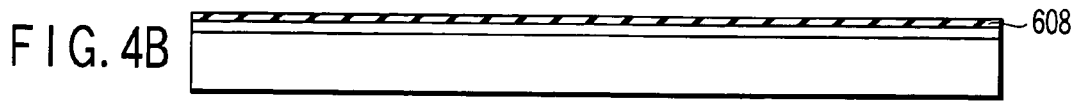
Figure 5:
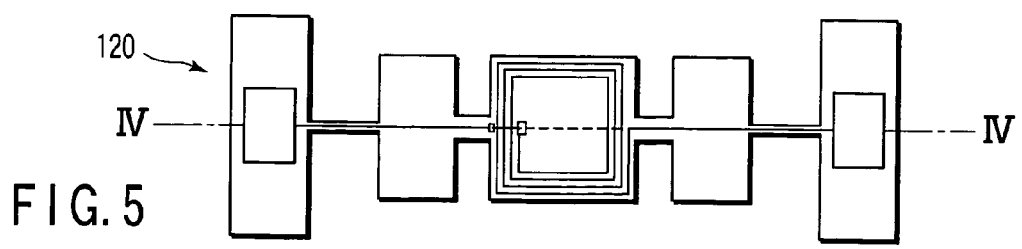
FIG. 5 shows the position of the section shown in FIG. 4A to FIG. 4H.

In a process of FIG. 4B, a silicon oxide film 608 is formed on the device layer 606. The silicon oxide film 608 is an insulating material, and insulates the electric elements including the drive coil 142, the wires 144a and 144b and the extraction electrodes 146a and 146b, which will be formed later, from the device layer 606.

Figure 4C:
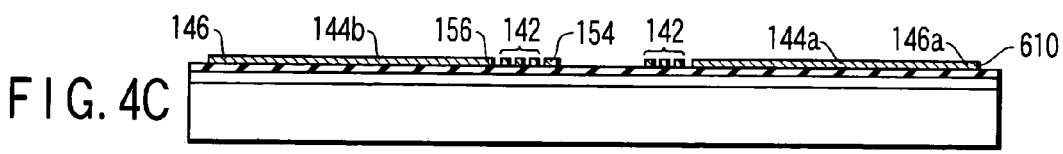

In a process of FIG. 4C, a conductive film 610 is formed on the silicon oxide film 608 and patterned to form the drive coil 142, the wires 144a and 144b and the extraction electrodes 146a and 146b. The conductive film 610 comprises, for example, an aluminum film formed by a sputter.

Figure 4D:
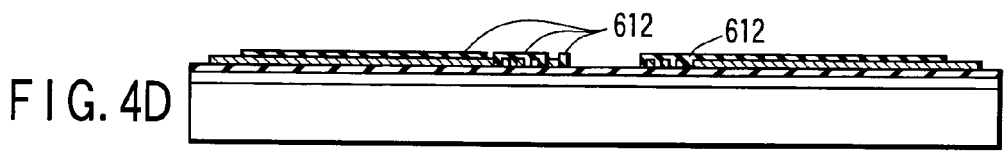

In a process of FIG. 4D, a passivation film 612 is formed on the conductive film 610 for insulation from the air and patterned such that the passivation film 612 is formed on the drive coil 142 and the wires 144a and 144b. During the patterning, parts of the passivation film corresponding to the extraction electrodes 146a and 146b on the fixing portion 130a and 130b, and to the contact pads 152 and 156 for the bridge wire 154 are removed.

Figure 4E:
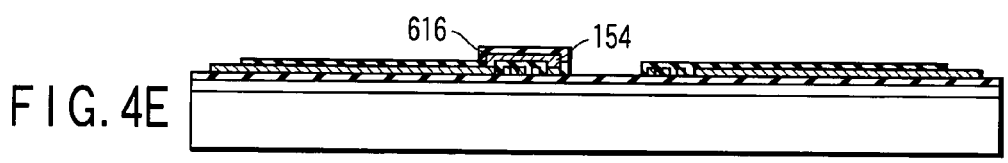

In a process of FIG. 4E, a conductive film 614 is formed on the passivation film 612 and patterned to form the bridge wire 154. Further, the bridge wire 154 is covered with an insulating film 616. The conductive film 614 is, for example, an aluminum film formed by the sputter film forming device, but may be a film of a material different from those of the wires and the like.

Figure 4F:
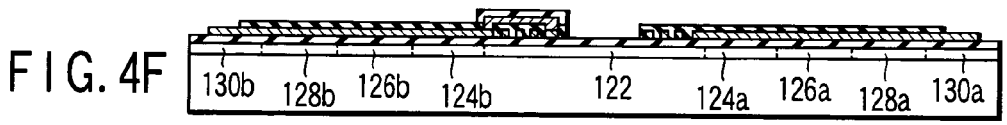

In a process of FIG. 4F, the device layer 606 is vertically passed through by a dry etching device, and a layer of the first movable plate 122, the second movable plates 126a and 126b and the fixing portions 130a and 130b, the first hinges 124a and 124b, and the second hinges 128a and 128b are formed.

Figure 4G:
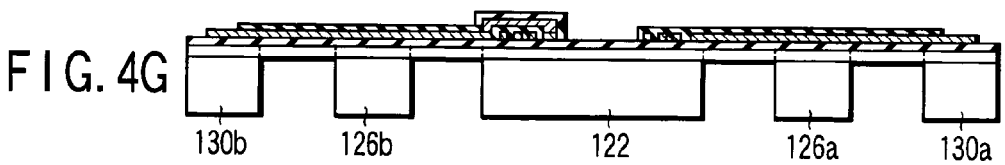

In a process of FIG. 4G, the handle layer 602 is vertically passed through by the dry etching device, and the first movable plate 122, the second movable plates 126a and 126b and the fixing portions 130a and 130b are formed.

Figure 4H:
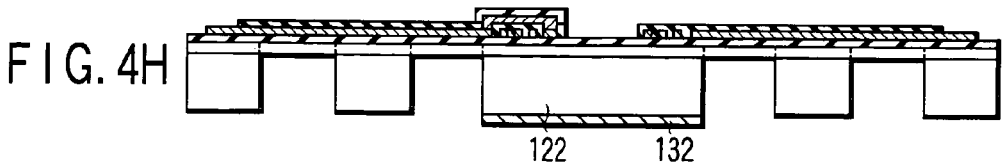

In a process of FIG. 4H, the reflective surface 132 is formed on the surface at the handle layer 602, that is, the lower surface of the first movable plate 122, thus attaining completion. The reflective surface depends on the wavelength of light to be deflected, and includes, for example, surface of an aluminum film, a gold film, a dielectric multilayer film or the like.

Figure 6:
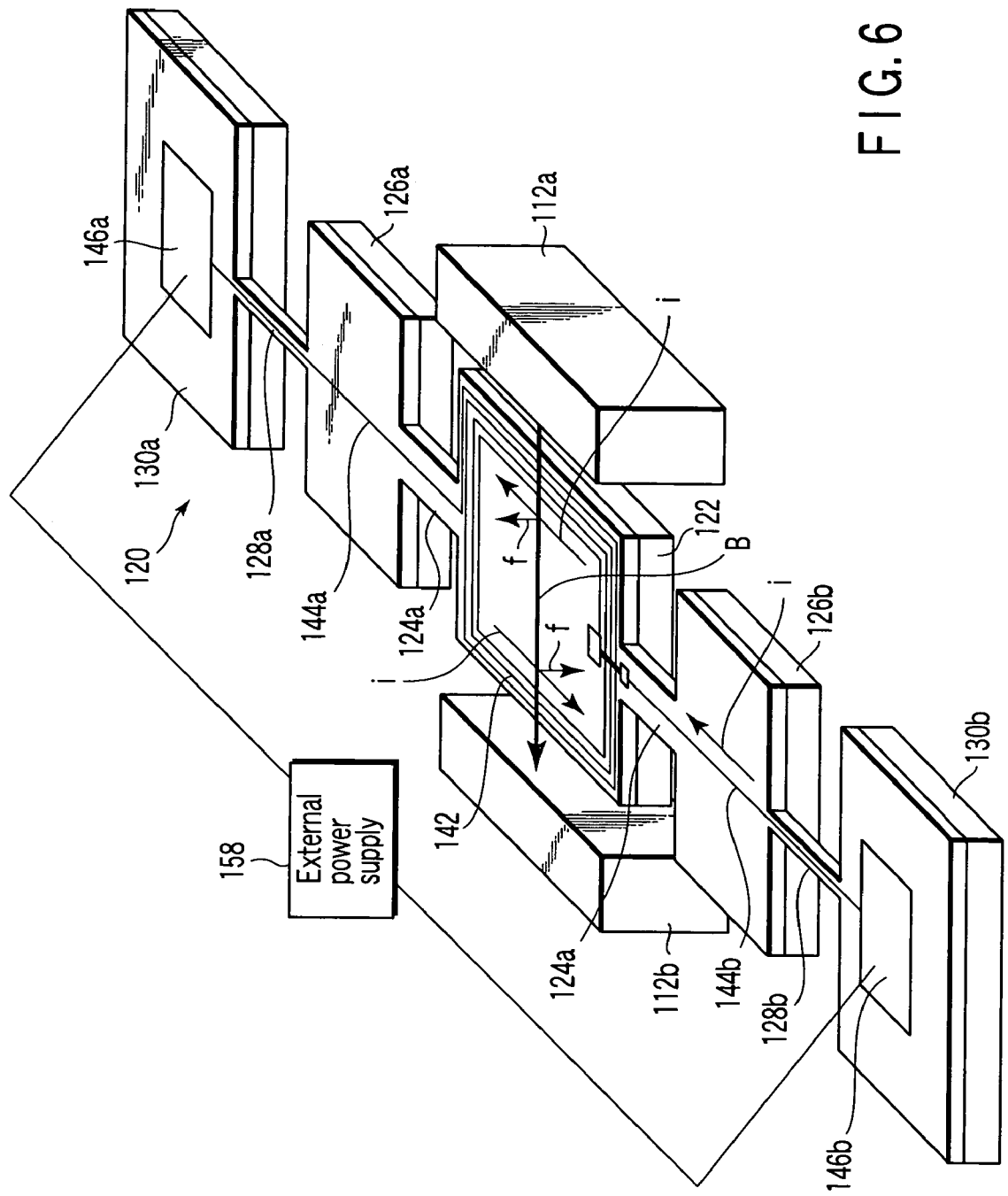
FIG. 6 is a diagram to explain the principle of actuating the light deflector shown in FIG. 2.

The operational principle of the light deflector 100 will next be described. FIG. 6 is a diagram to explain the principle of actuating the light deflector 100.

If a voltage is applied from an external power supply 158 to the extraction electrodes 146a and 146b to pass a current i through the drive coil 142 via wires 144a and 144b and 154 in a direction indicated by an arrow in FIG. 6, forces f are produced at a portion of the drive coil 142 perpendicular to a magnetic field, that is, at a portion of the drive coil 142 located near both sides of the first movable plate 122. Because the drive coil 142 goes around near the edge of the first movable plate 122, the forces f are produced at two places symmetrically with respect to the oscillation axis as shown in the drawing, and the directions of the forces f are opposite. If a magnetic flux density B and the number of times that the drive coil 142 is wound are the same, the magnitude of the forces produced at two places is equal, and the first movable plate 122 is subjected to a couple about the oscillation axis.

If the external power supply 158 is a direct-current power supply and the current passing through the drive coil 142 is a direct current, the couple acting on and the first movable plate 122 is constant, so that the first movable plate 122 is inclined about the oscillation axis. In that case, the angle of inclination of the first movable plate 122 depends on the intensity of the current passing through the drive coil 142.

If the external power supply 158 is an alternating-current power supply and the current passing through the drive coil 142 is an alternating current, the couple acting on the first movable plate 122 changes direction and magnitude periodically, so that the first movable plate 122 oscillates about the oscillation axis. In that case, the oscillation angle of the first movable plate 122 depends on the extent of amplitude of the alternating current passing through the drive coil 142.

Figure 7:
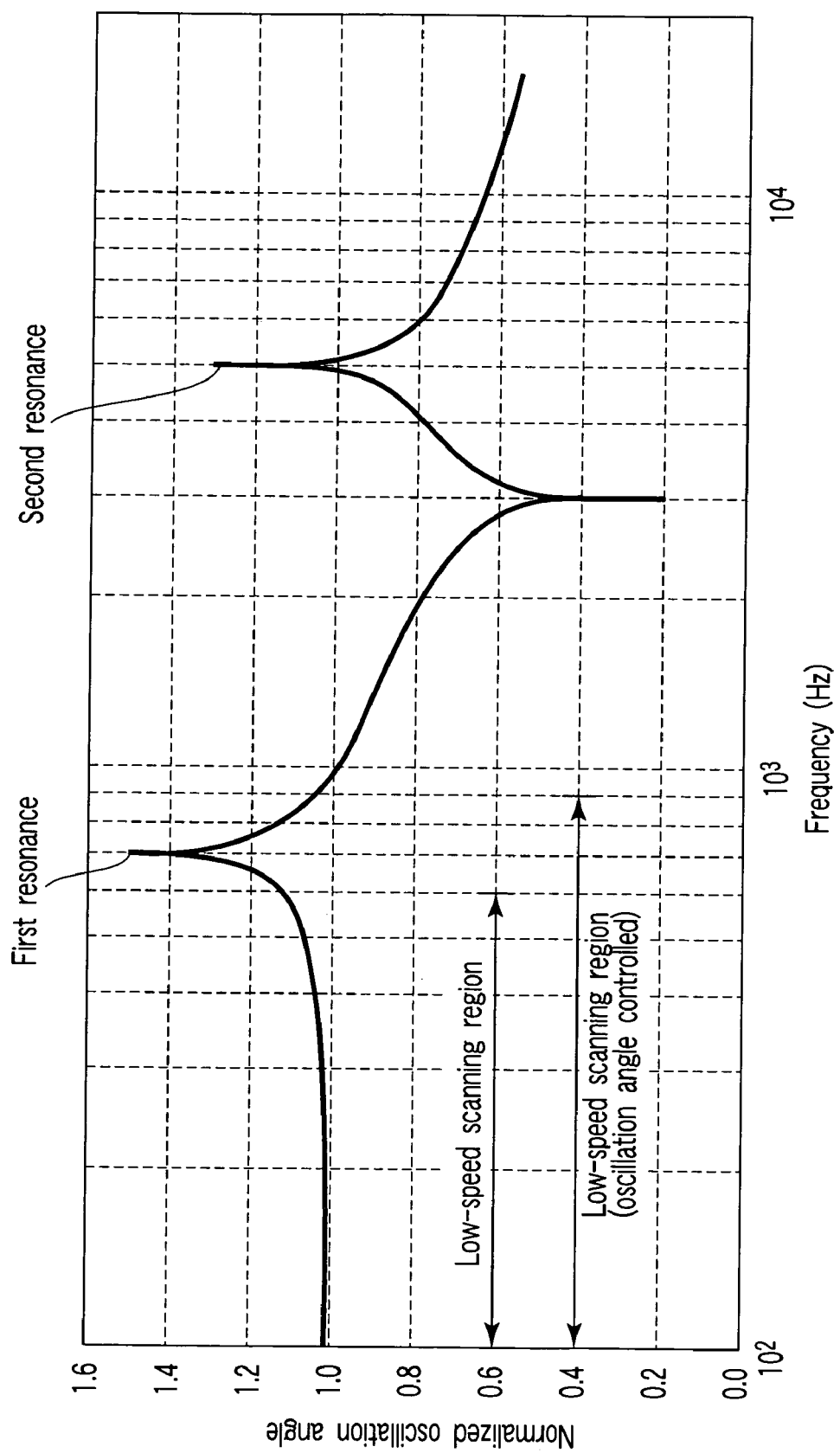
FIG. 7 shows oscillation angle characteristics of a first movable plate with regard to frequencies of an alternating current flowing through a drive coil, in the light deflector of the first embodiment.

FIG. 7 is a graph wherein an alternating current is passed through the drive coil 142 of the light deflector 100, and the frequency of the alternating current is changed to cause changes in the oscillation angle of the first movable plate 122. In other words, FIG. 7 shows oscillation angle characteristics of the first movable plate 122 with regard to the frequencies of the alternating current flowing through the drive coil 142. In the graph of FIG. 7, the horizontal axis indicates the frequency of alternating current flowing through the drive coil 142, and the vertical axis indicates the normalized oscillation angle of the first movable plate 122.

In FIG. 7, peaks in the vicinity of 700 Hz and 5 kHz indicate a resonant state about the oscillation axis of the first movable plate 122. Here, a low-frequency resonance in the vicinity of 700 Hz is called a first resonance, and a high-frequency resonance in the vicinity of 5 kHz is called a second resonance. That is, the light deflector 100 has two resonance frequencies, and a lower first resonance frequency is at a value close to 700 Hz and a higher second resonance frequency is at a value close to 5 kHz.

Figure 8:
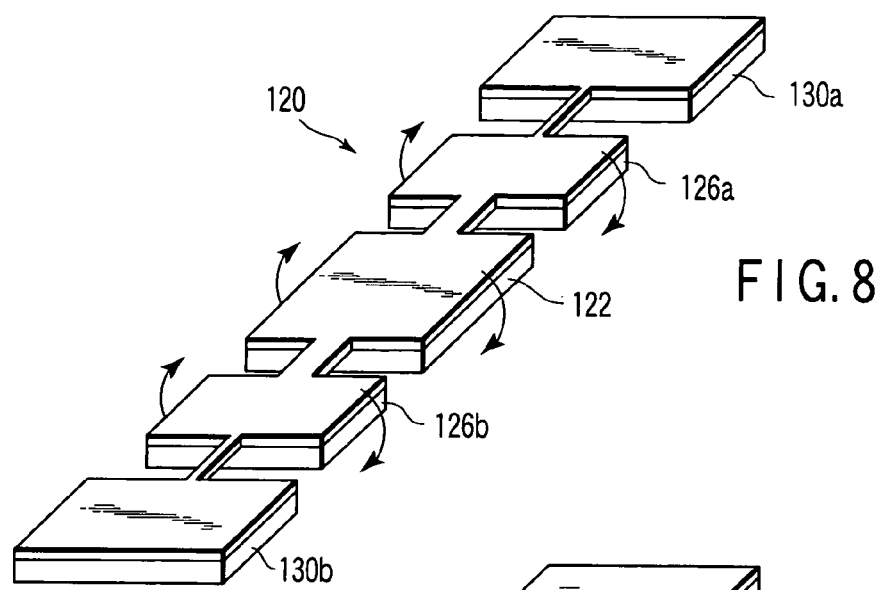
FIG. 8 shows the first movable plate and a second movable plate oscillating in phase, in the light deflector of the first embodiment.
Figure 9:
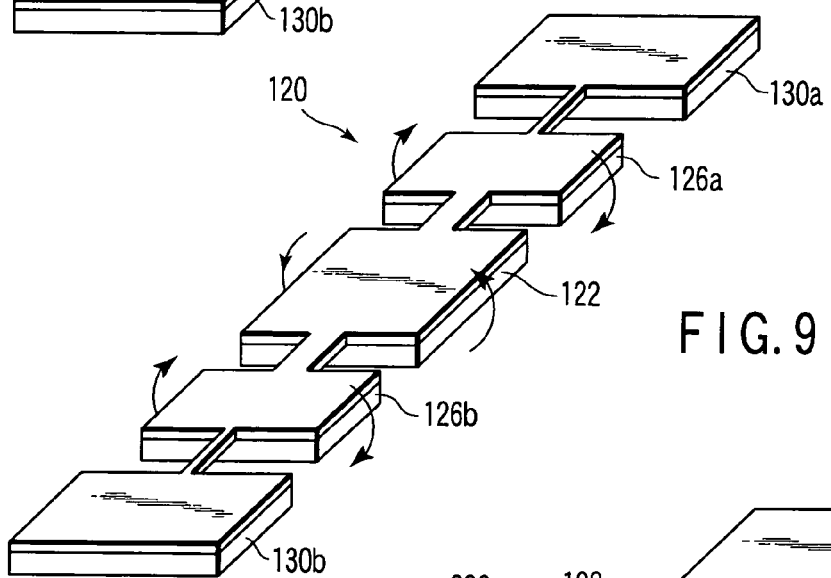
FIG. 9 shows the first movable plate and the second movable plate oscillating in opposite phase, in the light deflector of the first embodiment.

In the light deflector 100, the first movable plate 122 and the second movable plates 126a and 126b oscillate in phase in a frequency region ranging from 0 to the vicinity of the first resonance frequency, as shown in FIG. 8. Further, the first movable plate 122 and the second movable plates 126a and 126b oscillate in opposite phase in a frequency region around the second resonance frequency, as shown in FIG. 9.

Thus, in the light deflector 100, in accordance with the two resonance frequencies, there emerge a state in which the first movable plate 122 and the second movable plates 126a and 126b oscillate in phase, and a state in which the first movable plate 122 and the second movable plates 126a and 126b oscillate in opposite phase.

The light deflector 100 is designed so that the required oscillation angle (actuating efficiency) is obtained at a frequency lower than the first resonance frequency. As shown in FIG. 7, in the second resonance, actuating efficiency higher than the actuating efficiency that is obtained at a frequency lower than the first resonance frequency is obtained. For example, when the light deflector 100 in the present embodiment is utilized in a light scanning observation device using fluorescence, the second resonance is used in high-speed scanning for screening to decide an observing position. It is necessary to change the scanning rate depending on characteristics of a fluorescent material and observation conditions in low-speed scanning to obtain an image.

In the light deflector 100, a low-speed scanning region should desirably be set at a frequency lower than the first resonance frequency. If the light deflector 100 is to be used at or beyond the first resonance frequency, the oscillation angle extremely increases in the vicinity of the first resonance frequency, so that a system that detects and controls the oscillation angle is required. If a premise is made that the system of controlling the oscillation angle is provided, the light deflector 100 may be used beyond the first resonance frequency. However, as the actuating efficiency to be obtained is reduced due to an increase in the frequency, there is a limit in the range of frequencies that can be used.

Next, the actuating efficiency in the second resonance state will be described. The actuating efficiency of the first movable plate 122 in the low-speed scanning region depends on a driving force depending on a spatial magnetic flux density obtained by the permanent magnets 112a and 112b and the amount of current flowing through the drive coil 142, and the torsional stiffness of the second hinges 128a and 128b. The actuating efficiency of the first movable plate 122 in the high-speed scanning region actuated in a second resonant state is influenced by the moment of inertia of the first movable plate 122 and the moment of inertia of the second movable plates 126a and 126b, in addition to the driving force and the torsional stiffness of the first hinges 124a and 124b.

In the second resonant state, the second movable plates 126a and 126b oscillate in opposite phase with the first movable plate 122. The moment of inertia has an effect especially on the ratio between the actuating efficiency of the first movable plate 122 and the actuating efficiency of the second movable plates 126a and 126b.

Since the light deflector 100 deflects a beam of light with the reflective surface formed on the first movable plate 122, the first movable plate 122 desirably has an actuating efficiency higher than that of the second movable plates 126a and 126b. If the total moment of inertia of the two second movable plates 126a and 126b provided on both sides of the first movable plate 122 is made larger than the moment of inertia of the first movable plate 122, the actuating efficiency of the first movable plate 122 becomes larger than the actuating efficiency of the second movable plates 126a and 126b, resulting in an improvement of the actuating efficiency. That is, the actuating efficiency of the first movable plate 122 and the second movable plates 126a and 126b changes in accordance with the difference between their moment of inertia. If the total moment of inertia of the second movable plates 126a and 126b is smaller than the moment of inertia of the first movable plate 122, the second movable plates 126a and 126b oscillate more largely, and in a contrary case, the first movable plate 122 oscillates more largely. If the total moment of inertia of the second movable plates 126a and 126b further increases, the second movable plates 126a and 126b hardly oscillate and the first movable plate 122 alone will oscillate. It is to be noted that the total moment of inertia of the second movable plates 126a and 126b is preferably set to such a degree that a desired the low-speed scanning region is ensured.

The low-speed scanning region ranges from DC (frequency 0) to less than the first resonance, and the first resonance frequency decides the low-speed scanning region. The first resonance frequency depends on the total moment of inertia of the first movable plate 122 and the second movable plates 126a and 126b including the first hinges 124a and 124b and the stiffness of the second hinges 128a and 128b, and this can be expressed by the following equation (1). It can be understood that because a moment of inertia I is the denominator, the first resonance frequency becomes smaller as the moment of inertia I increases.

$$Fr = \frac{1}{2\pi}\sqrt{\frac{2k \times G}{L \times I}} \tag{1}$$

Here, Fr is the resonance frequency, k is the polar moment of inertia of area of the second hinges 128a and 128b, G is a modulus of transverse elasticity of the second hinges 128a and 128b, L is the length of the second hinges 128a and 128b, I is the total moment of inertia of the first movable plate 122 and the second movable plates 126a and 126b including the first hinges 124a and 124b.

As mentioned in the explanation of the method of manufacturing the movable plate unit 120, the first movable plate 122 and the second movable plates 126a and 126b have the same thickness, and it is difficult to make a difference in their thickness considering the manufacturing method. Therefore, sizes other than the thickness need to be changed to increase the moment of inertia, but to increase the number of movable plate units 120, the width (dimension along an axis vertical to the oscillation axis) of the second movable plates 126a and 126b should be adapted to the width of the first movable plate 122. Therefore, the moment of inertia of the second movable plates 126a and 126b may desirably be adjusted by changing the length (dimension along the oscillation axis) of the second movable plates.

As understood from the explanation so far, the light deflector 100 in the present embodiment has the actuating efficiency sufficient to be able to support both the low-speed scanning in which an actuating frequency is variable and the high-speed scanning in which the actuating frequency is fixed. Further, the total moment of inertia of the second movable plates 126a and 126b can be optimized to expand the low-speed scanning region, so that the actuating frequency can be changed in a wide range.

The configuration in the present embodiment can naturally be variously changed and modified.

First Modification

Figure 10:
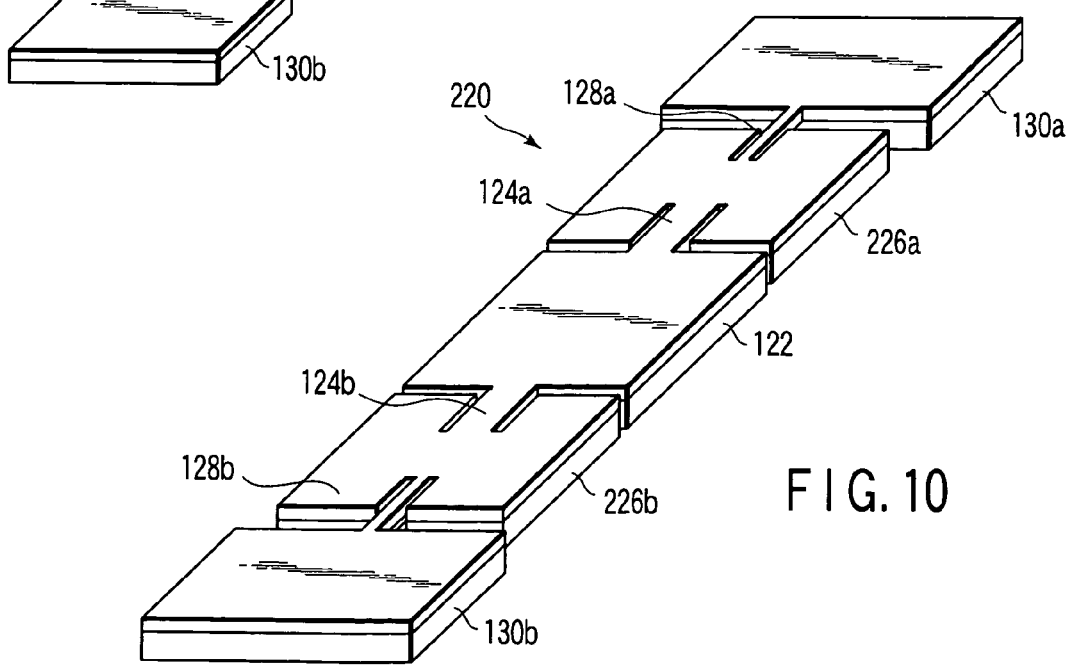
FIG. 10 is a perspective view of the movable plate unit according to a first modification.
Figure 11:
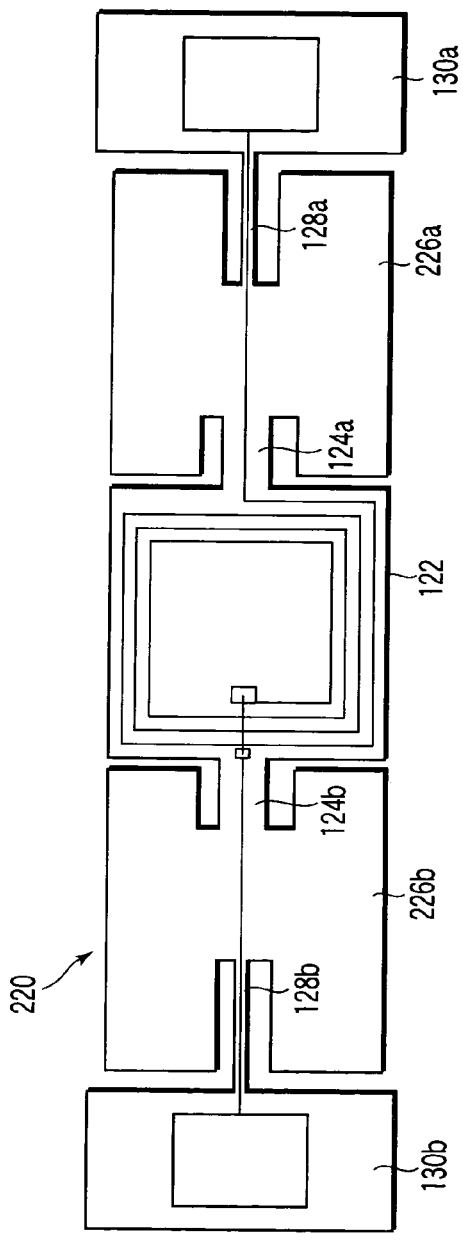
FIG. 11 is a top view of the movable plate unit shown in FIG. 10.

A first modification is directed to another movable plate unit applicable instead of the movable plate unit 120 shown in FIG. 1. FIG. 10 is a perspective view of the movable plate unit according to the first modification, and FIG. 11 is a top view of the movable plate unit shown in FIG. 10. In FIG. 10 and FIG. 11, members indicated by the same reference numerals as the members shown in FIG. 1 are the same and will not be described in detail.

As shown in FIG. 10 and FIG. 11, the difference between a movable plate unit 220 in the present modification and the movable plate unit 120 in FIG. 1 lies in the form of second movable plates 226a and 226b. In the movable plate unit 220, the second movable plates 226a and 226b are provided with notches at portions located on both sides of the first hinges 124a and 124b and the second hinges 128a and 128b. In this way, the length of the movable plate unit 220 is reduced as compared with that of the movable plate unit 120 in the first embodiment while the first hinges 124a and 124b and the second hinges 128a and 128b maintain the same length as in the first embodiment.

Second Modification

Figure 12:
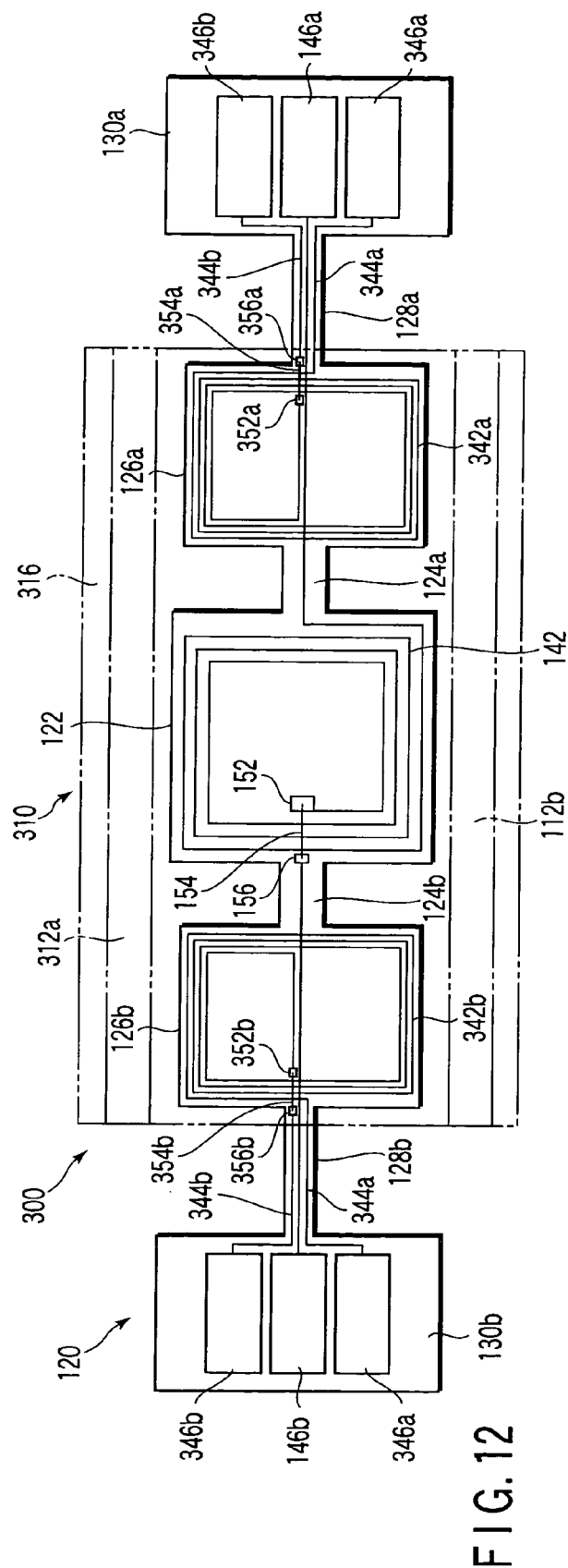
FIG. 12 is a top view of the light deflector according to a second modification.

A second modification is directed to an improvement of the light deflector of the first embodiment. FIG. 12 is a top view of the light deflector according to the second modification. In FIG. 12, members indicated by the same reference numerals as the members shown in FIG. 1 are the same and will not be described in detail.

As shown in FIG. 12, in a light deflector 300 of the second modification, a movable plate unit 320 has, in addition to the configuration of the movable plate unit 120 of the first embodiment, second drive coils 342a and 342b provided in the second movable plates 126a and 126b, respectively, and two pairs of extraction electrodes 346a and 346b provided in the fixing portions 130a and 130b, respectively. The second drive coils 342a and 342b go around near the edges of the second movable plates 126a and 126b, respectively. Outer ends of the second drive coils 342a and 342b are electrically connected to the extraction electrodes 346a and 346a, respectively, which are provided in the fixing portions 130a and 130b, respectively, via wires 344a and 344a passing the second hinges 128a and 128b.

Furthermore, inner ends of the second drive coils 342a and 342b are connected to contact pads 352a and 352b, respectively, and the contact pads 352a and 352b are electrically connected to contact pads 356a and 356b, respectively, which are provided outside the second drive coils 342a and 342b, via bridge wires 354a and 354b which cross over the second drive coils 342a and 342b through insulating layers. The contact pads 356a and 356b are electrically connected to the extraction electrodes 346b and 346b, respectively, which are provided in the fixing portions 130a and 130b, respectively, via wires 344b and 344b passing the second hinges 128a and 128b.

These electric elements (the second drive coils 342a and 342b, the wires 344a and 344b, etc.) are provided on the upper side of the movable plate unit 320, and are covered with an insulating film, which is not shown in the drawing, except for the extraction electrodes 346a and 346b.

Furthermore, in the light deflector 300 of the second modification, a pair of permanent magnets 312a and 312b and a yoke 316 constituting a magnetic circuit 310 have a length to be located on both sides of the first movable plate 122 and the second movable plates 126a and 126b. That is, the dimension of the permanent magnets 312a and 312b and the yoke 316 along the oscillation axis is larger than the total length of the first movable plate 122, the first hinges 124a and 124b and the second movable plates 126a and 126b.

The permanent magnets 312a and 312b constitute a magnetic field generator to generate a magnetic field crossing the first movable plate 122 and the second movable plates 126a and 126b. The second drive coils 342a and 342b provided in the second movable plates 126a and 126b, respectively, and the permanent magnets 312a and 312b located on both sides of the second movable plates 126a and 126b constitute actuating means or an actuator to oscillate the second movable plates 126a and 126b. By the actuating means or actuator, the second movable plates 126a and 126b oscillate in totally the same manner as in the principle of oscillating the first movable plate 122.

In the light deflector 300, the actuating means or actuator to oscillate the second movable plates 126a and 126b can be used to improve the actuating efficiency of oscillating the first movable plate 122.

Figure 13:
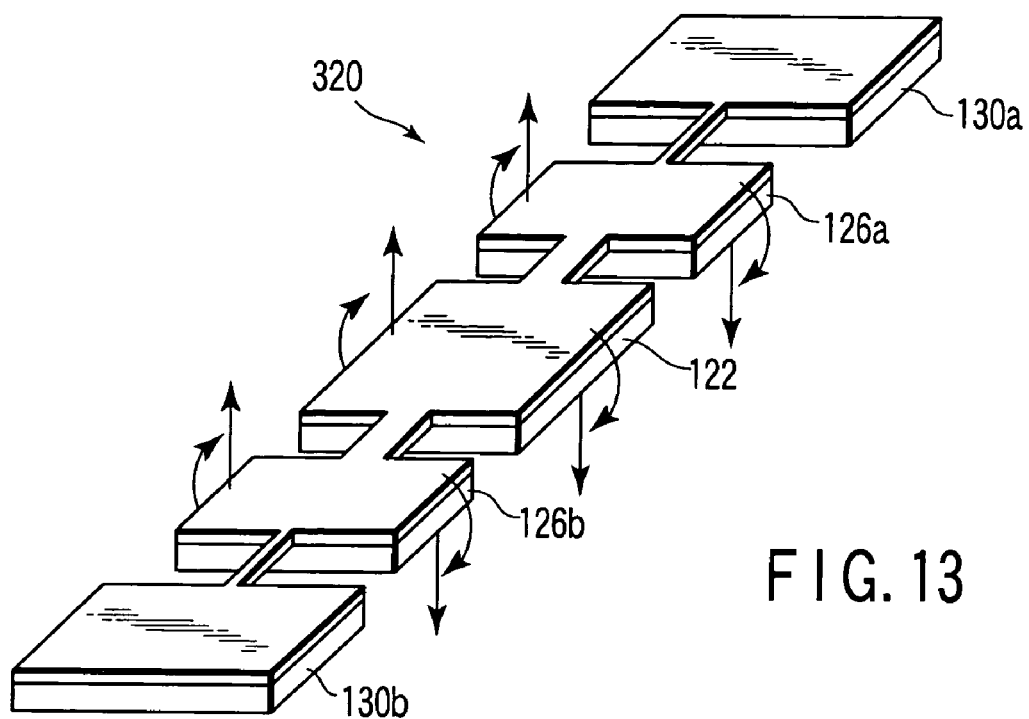
FIG. 13 shows the force acting on the first movable plate and the second movable plate during low-speed scanning, in the deflector shown in FIG. 12.

In the low-speed scanning region, as the first movable plate 122 and the second movable plates 126a and 126b oscillate in phase as described above, a current may preferably be passed through the second drive coils 342a and 342b in the same direction as the drive coil 142, as shown in FIG. 13. Thus, a couple in the same direction as the couple acting on the first movable plate 122 works on the second movable plates 126a and 126b, so that the force to oscillate the first movable plate 122 is practically improved. This results in an improvement in the actuating efficiency of the first movable plate 122.

Figure 14:
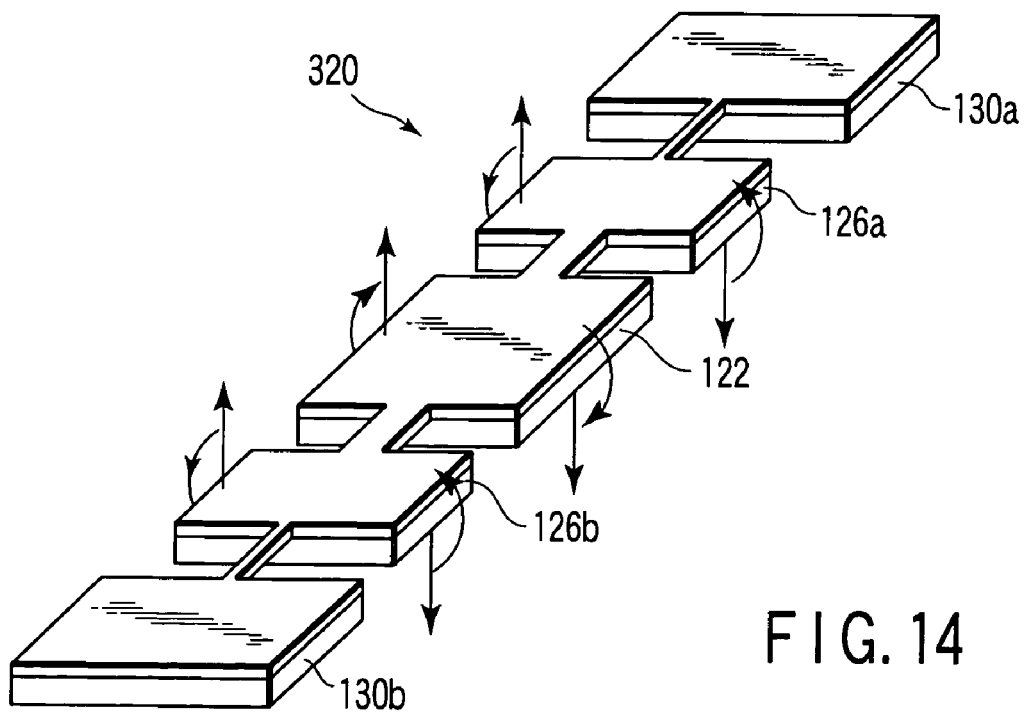
FIG. 14 shows the force acting on the first movable plate and the second movable plate during high-speed scanning, in the deflector shown in FIG. 12.

In the high-speed scanning region, as the first movable plate 122 and the second movable plates 126a and 126b oscillate in opposite phase as described above, a current may also be preferably passed through the second drive coils 342a and 342b in the same direction as the drive coil 142, as shown in FIG. 14. Thus, the couple in the same direction as the couple acting on the first movable plate 122 works on the second movable plates 126a and 126b, so that the oscillation of the second movable plates 126a and 126b is restricted. This is equivalent to an increase in the apparent moment of inertia of the second movable plates 126a and 126b. Therefore, the force to oscillate the first movable plate 122 is practically improved. This results in an improvement in the actuating efficiency of the first movable plate 122. Especially when the moment of inertia of the second movable plates 126a and 126b is smaller than the moment of inertia of the first movable plate 122, the first movable plate 122 can oscillate sufficiently largely.

Third Modification

Figure 15:
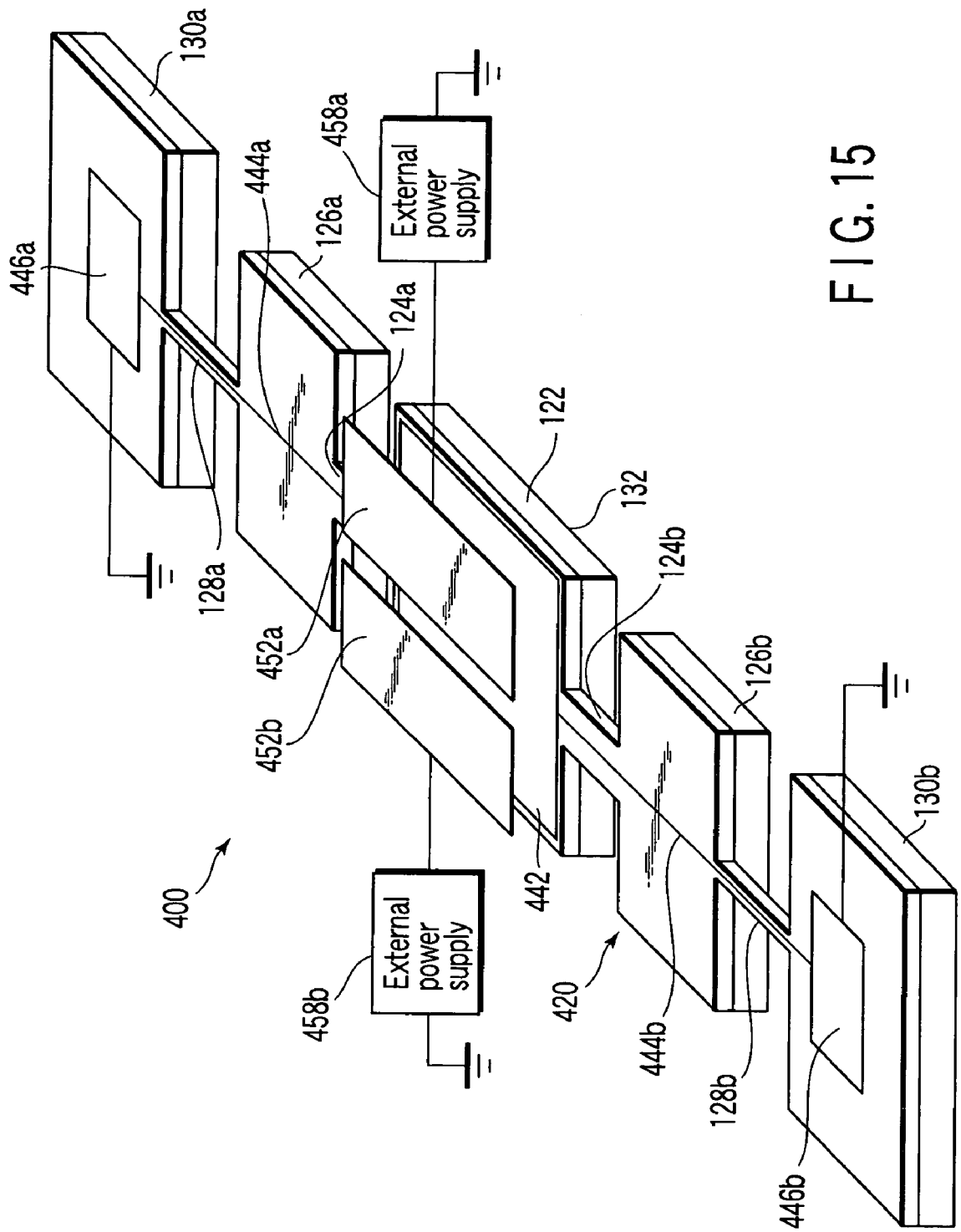
FIG. 15 is a perspective view of the light deflector according to a third modification.

A third modification is directed to a light deflector having actuating means or an actuator different from that in the first embodiment to oscillate the first movable plate 122. FIG. 15 is a perspective view of the light deflector according to the third modification. In FIG. 15, members indicated by the same reference numerals as the members shown in FIG. 1 are the same and will not be described in detail.

The actuating means or actuator in the third modification comprises an electrode provided in the first movable plate 122, and electrodes provided to face the electrode in the first movable plate 122.

Concretely, as shown in FIG. 15, a light deflector 400 according to the third modification has an electrode plate 442 provided in the first movable plate 122, and two drive electrode plates 452a and 452b disposed with a space to face the electrode plate 442. The two drive electrode plates 452a and 452b are disposed with a space in parallel with the oscillation axis. Further, in a projection of the two drive electrode plates 452a and 452b to the first movable plate 122, the two drive electrode plates 452a and 452b are located with the oscillation axis in between.

The electrode plate 442 on the first movable plate 122 is electrically connected to extraction electrodes 446a and 446b that are provided in the fixing portions 130a and 130b, respectively, via wires 444a and 444a passing the first hinges 124a and 124b, the second movable plates 126a and 126b and the second hinges 128a and 128b.

The electrode plate 442 on the first movable plate 122 is maintained at a constant potential, for example, a GND potential. Moreover, the two drive electrode plates 452a and 452b facing the electrode plate 442 are provided with different potentials by external power supplies 458*a* and 458*b*, respectively. Thus, different intensities of electrostatic attractions are produced between one of the drive electrode plates 452*a* and 452*b* and the electrode plate 442 on the first movable plate 122 and between the other one of the drive electrode plates 452*a* and 452*b* and the electrode plate 442 on the first movable plate 122. Therefore, the first movable plate 122 is subjected to a torque about the oscillation axis.

For example, when a voltage across the drive electrode plate 452*a* and the electrode plate 442 is Va and a voltage across the drive electrode plate 452*b* and the electrode plate 442 is Vb, the first movable plate 122 is subjected to a counterclockwise torque (a torque in a rotating direction to bring the electrode plate 442 close to the drive electrode plate 452*a*) if Va>Vb, and the first movable plate 122 is, on the contrary, subjected to a clockwise torque (a torque in a rotating direction to bring the electrode plate 442 close to the drive electrode plate 452*b*) if Va<Vb.

If the external power supplies 458*a* and 458*b* are direct-current power supplies and the voltage applied across the electrode plate 442 and the drive electrode plates 452*a* and 452*b* is constant, the force acting on the first movable plate 122 is constant, so that the first movable plate 122 is inclined about the oscillation axis. In that case, the angle of inclination of the first movable plate 122 depends on the intensity of the constant voltage applied across the electrode plate 442 and the drive electrode plates 452*a* and 452*b*.

If the external power supplies 458*a* and 458*b* are alternating-current power supplies and the voltage applied across the electrode plate 442 and the drive electrode plates 452*a* and 452*b* is an alternating voltage, the force acting on the first movable plate 122 changes direction and magnitude periodically, so that the first movable plate 122 oscillates about the oscillation axis. In that case, the oscillation angle of the first movable plate 122 depends on the extent of amplitude of the alternating voltage applied across the electrode plate 442 and the drive electrode plates 452*a* and 452*b*.

Figure 16:
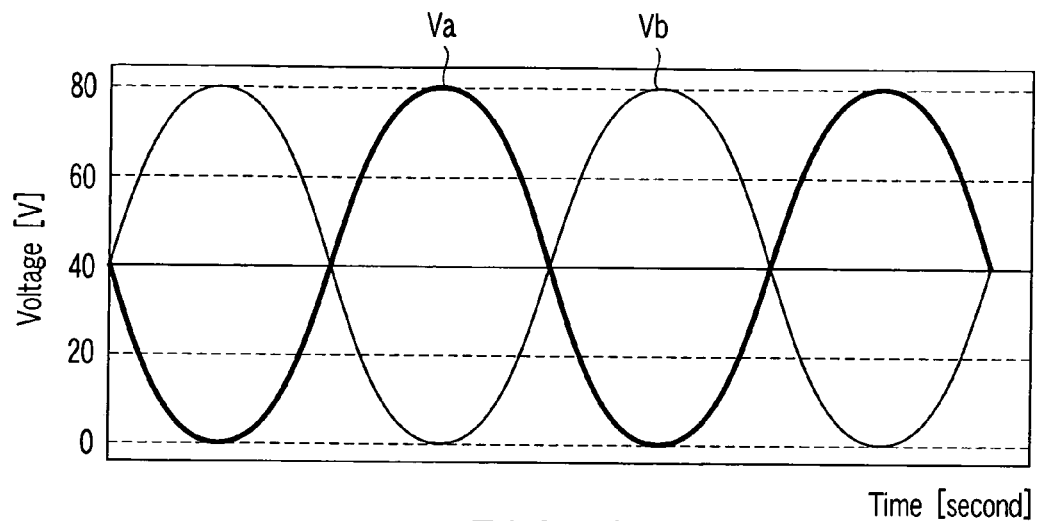
FIG. 16 shows preferred waveforms of alternating voltages applied to two drive electrode plates, in the deflector shown in FIG. 15.

The alternating voltages Va and Vb applied across the electrode plate 442 and the drive electrode plates 452*a* and 452*b*, respectively, preferably have substantially sinusoidal waveforms in opposite phase with each other to which a constant offset voltage is applied, as shown in FIG. 16. The first movable plate 122 is actuated along the sinusoidal waveform of the drive voltage, and is actuated such that the phase is lagged by 90 degrees with respect to the drive voltage in a resonant state.

An actuating method of the present embodiment has an advantage that the actuating efficiency is lower than that in an actuating method using the drive coil and that the oscillation angle to be obtained is small, but the configuration is simple. It is therefore useful for applications wherein a high actuating efficiency or a large oscillation angle is not needed.

In the light deflector 400 of the present modification, the similar actuating means or actuator can also be provided for the second movable plates, as in the second modification. In that case, the similar effects as in the second modification can also be expected.

Fourth Modification

A fourth modification is directed to an improve-ment of the light deflector of the first embodiment. The light deflector of the present modification has a configuration in which a capacitive sensing type oscillation angle detection function to detect the oscillation angle of the second movable plates is added to the light deflector of the first embodiment. The principle of actuating the first movable plate 122 is the same as that in the first embodiment.

Figure 17:
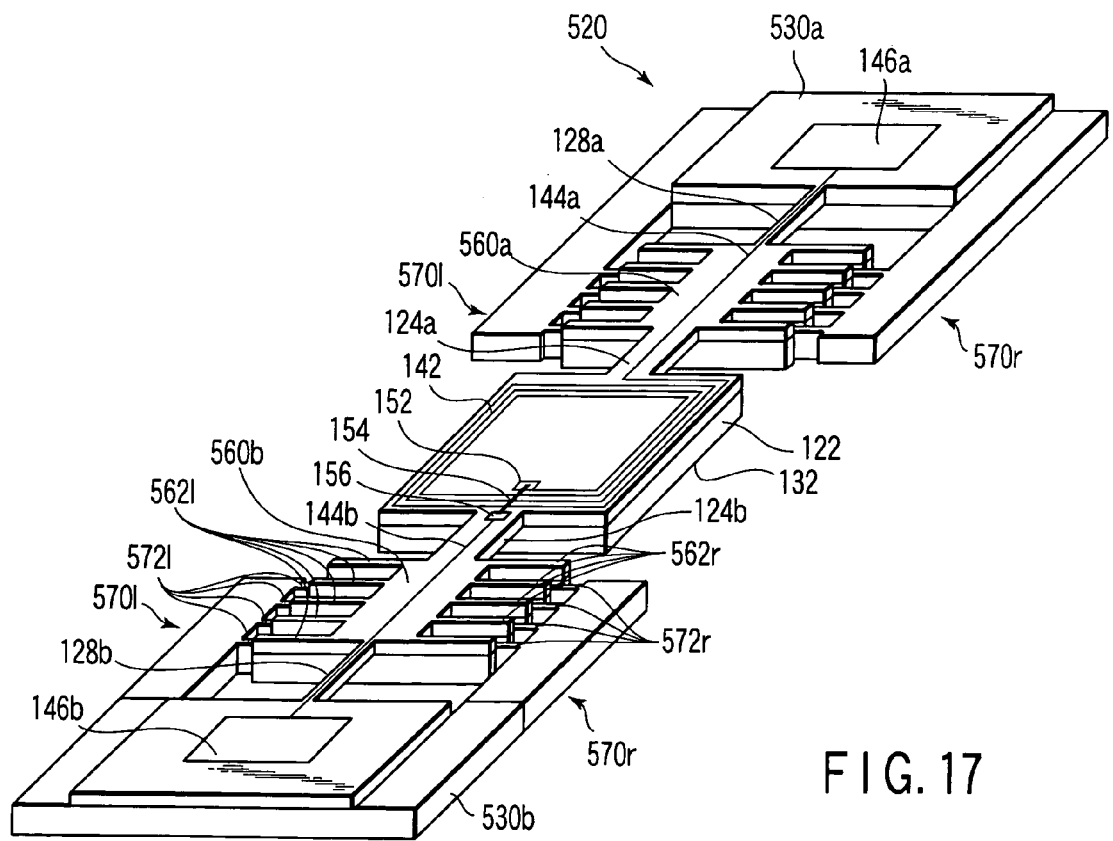
FIG. 17 is a perspective view of the movable plate unit in the light deflector according to a fourth modification.

FIG. 17 is a perspective view of the movable plate unit in the light deflector according to the fourth modification. In FIG. 17, members indicated by the same reference numerals as the members shown in FIG. 1 are the same and will not be described in detail.

As shown in FIG. 17, in a movable plate unit 520 of the present modification, second movable plates 560*a* and 560*b* that are located between the first hinges 124*a* and 124*b* and the second hinges 128*a* and 128*b*, respectively, have comb teeth 562*r* and 562*l* extending outward on both sides substantially vertically to the oscillation axis.

Furthermore, each of fixing portions 530*a* and 530*b* has a pair of extensions 570*r* and 570*l* located on both sides of the second movable plates 560*a* and 560*b*. The extensions 570*r* and 570*l* have comb teeth 572*r* and 572*l* extending inward on both sides substantially vertically to the oscillation axis, respectively.

The comb teeth 562*r* and 562*l* of the second movable plates 560*a* and 560*b* and the comb teeth 572*r* and 572*l* of the extensions 570*r* and 570*l* break into each other's spaces between the teeth.

Figure 18:
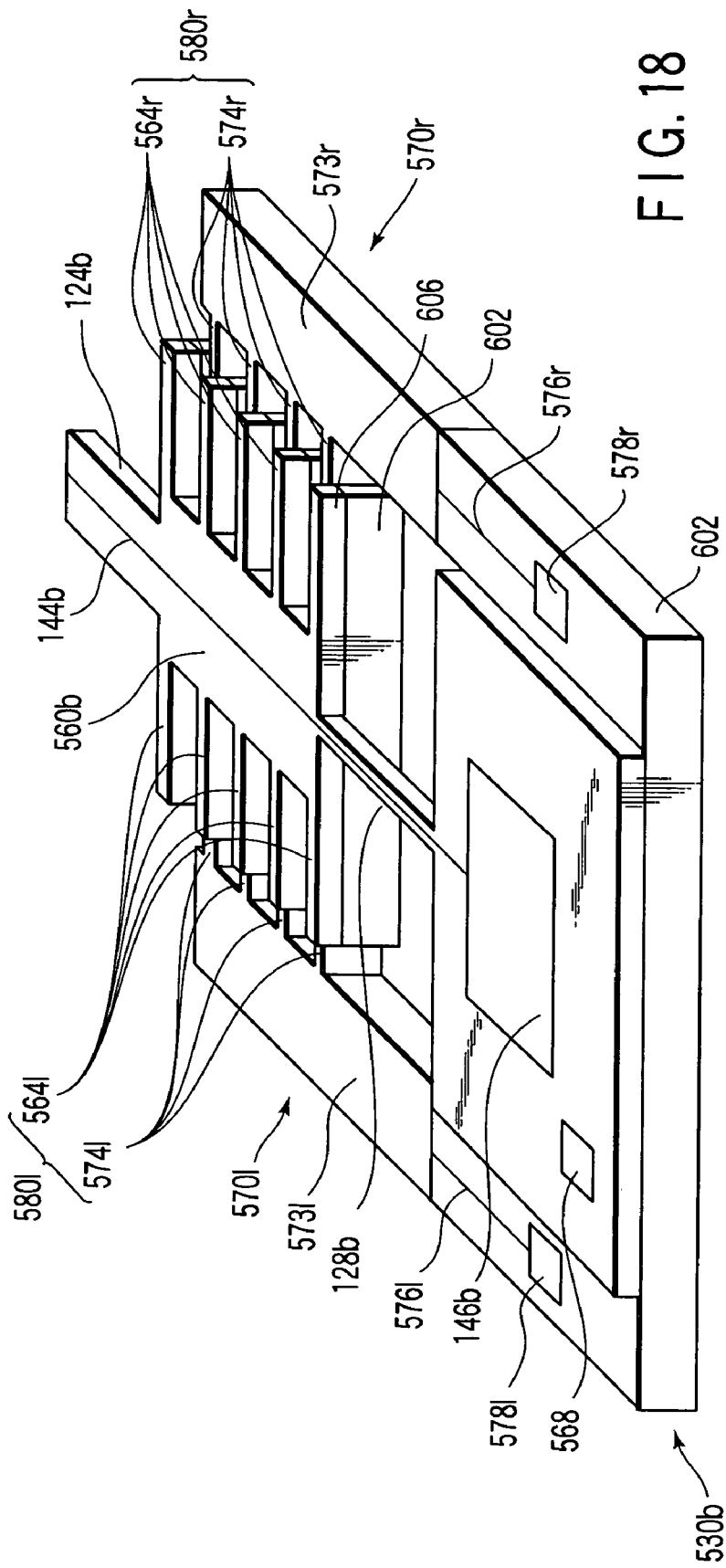
FIG. 18 shows, in an enlarged manner, the second movable plate, a second hinge and a fixing portion on a near side of FIG. 17.

A detailed configuration of the capacitive sensing type oscillation angle detection function will be described below referring to FIG. 18. FIG. 18 shows, in an enlarged manner, the second movable plate, the second hinge and the fixing portion on a near side of FIG. 17. Therefore, FIG. 18 only shows the configuration of the second movable plate, the second hinge and the fixing portion on the near side of FIG. 17, but the second movable plate, the second hinge and the fixing portion on the far side of FIG. 17 naturally have the same configuration. Thus, in the following description, when reference is made to the second movable plate, the second hinge and the fixing portion on the near side of FIG. 17, reference numerals of the second movable plate, the second hinge and the fixing portion on the far side of FIG. 17 will be noted together.

As shown in FIG. 18, the second movable plates 560*a* and 560*b* include the device layer 606 and the handle layer 602. Further, parts of the device layer 606 located at the second movable plates 560*a* and 560*b*, the second hinges 128*a* and 128*b* and the fixing portions 530*a* and 530*b* have been doped by, for example, an ion implantation technique, so that electric resistance of surface parts are reduced. Thus, the comb teeth 562*r* and 562*l* of the second movable plates 560*a* and 560*b* serve as electrodes only in the part corresponding to the device layer 606. The part of the comb teeth 562*r* and 562*l* of the second movable plates 560*a* and 560*b* corresponding to the device layer 606 will hereinafter be called movable side comb teeth electrodes 564*r* and 564*l*.

An insulating film such as a silicon oxide film, which is not shown, is provided on the device layer 606, and the wires 144*a* and 144*b* and the extraction electrodes 146*a* and 146*b* are formed on the insulating film. This provides insulation of the wires 144*a* and 144*b* and the extraction electrodes 146*a* and 146*b* from the device layer 606. Moreover, parts of the insulating film located on the fixing portions 530*a* and 530*b* are selectively removed, and part of the device layer 606 is exposed. The exposed part of the device layer 606 is a movable side extraction electrode 568.

The extensions 570*r* and 570*l* is made from the handle layer 602, and an insulating film such as a silicon oxide film, which is not shown, is provided on the handle layer 602. On this insulating film, a conductive thin film made of aluminum or the like is formed and patterned to provide electrode portions 573*r* and 573*l* located on upper surfaces of the extensions 570r and 570l, fixed side extraction electrodes 578r and 578l located in the fixing portions 530a and 530b, and wires 576r and 576l electrically connecting the electrode portions 573r and 573l and the fixed side extraction electrodes 578r and 578l. Parts of the electrode portions 573r and 573l located on the comb teeth 572r and 572l of the extensions 570r and 570l will hereinafter be called fixed side comb teeth electrodes 574r and 574l.

The movable side comb teeth electrode 564r and the fixed side comb teeth electrode 574r on the right side constitute a right side capacitive sensor 580r, and the movable side comb teeth electrode 564l and the fixed side comb teeth electrode 574l on the left side constitute a left side capacitive sensor 580l. Because the electrode portion 573r, the wire 576r and the fixed side extraction electrode 578r on the right side are electrically independent from the electrode portion 573l, the wire 576l and the fixed side extraction electrode 578l on the left side, the capacitance between the movable side comb teeth electrode 564r and the fixed side comb teeth electrode 574r on the right side and the capacitance between the movable side comb teeth electrode 564l and the fixed side comb teeth electrode 574l on the left side are detected independently.

Furthermore, the right side capacitive sensor 580r and the left side capacitive sensor 580l, i.e., the movable side comb teeth electrodes 564r and 564l and the fixed side comb teeth electrodes 574r and 574l cooperate with an oscillation angle detection circuit described later to constitute detecting means or a detector to detect the oscillation angle of the second movable plates 560a and 560b.

Figure 19:
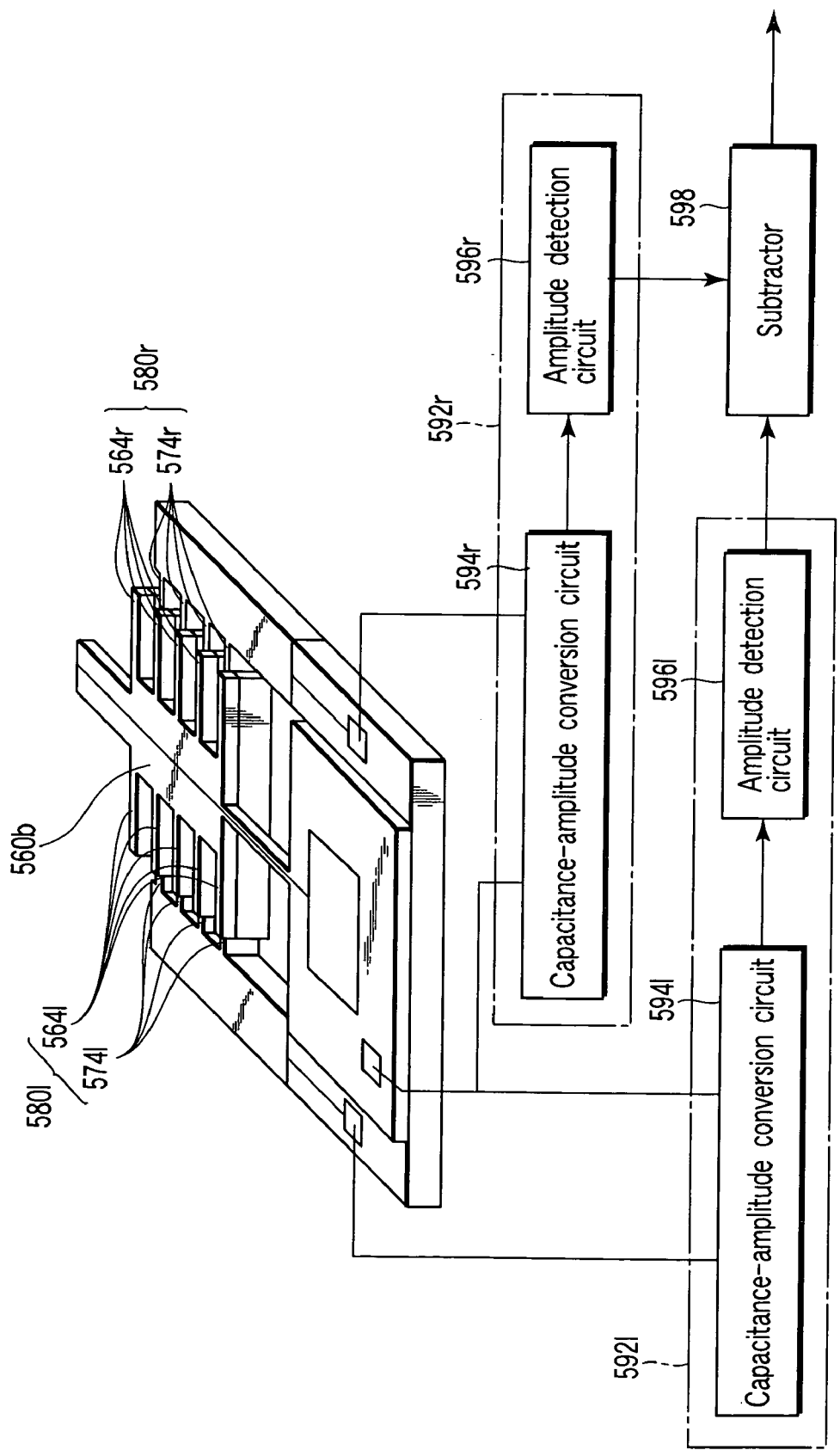
FIG. 19 shows a configuration of an oscillation angle detection circuit which detects the oscillation angle of the second movable plate, in the light deflector according to the fourth modification.

Next, a method of detecting the oscillation angle of the second movable plates 560a and 560b will be described referring to FIG. 19. FIG. 19 shows a configuration of the oscillation angle detection circuit which detects the oscillation angle of the second movable plates 560a and 560b.

As shown in FIG. 19, the oscillation angle detection circuit has a first detection circuit 592r to detect the clockwise oscillation angle of the second movable plates 560a and 560b, a second detection circuit 592l to detect the counterclockwise oscillation angle of the second movable plates 560a and 560b, and a subtractor 598 for subtraction processing of an output of the first detection circuit 592r and an output of the second detection circuit 592l.

The first detection circuit 592r has a capacitance-amplitude conversion circuit 594r and an amplitude detection circuit 596r, and the second detection circuit 592l similarly has a capacitance-amplitude conversion circuit 594l and an amplitude detection circuit 596l.

To detect capacitance, the capacitance-amplitude conversion circuit 594r applies a voltage signal having a frequency far beyond the actuating frequency across the movable side extraction electrode 568 and the fixed side extraction electrode 578r. The capacitance-amplitude conversion circuit 594l applies a voltage signal, which is the same as that applied by the capacitance-amplitude conversion circuit 594r, across the movable side extraction electrode 568 and the fixed side extraction electrode 578l. For example, the movable side extraction electrode 568 is maintained at a GND potential, and the capacitance-amplitude conversion circuits 594r and 594l apply the above-mentioned voltage signals to the fixed side extraction electrodes 578r and 578l.

The movable side comb teeth electrodes 564r and 564l are both formed on the device layer 606, and the fixed side comb teeth electrodes 574r and 574l are both formed on the handle layer 602. Thus, when the oscillation angle of the second movable plates 560a and 560b is 0 degrees or close to 0 degrees, the area of a part where the movable side comb teeth electrodes 564r and 564l face the fixed side comb teeth electrodes 574r and 574l is 0. In other words, when viewed from a direction parallel with the oscillation axis, the movable side comb teeth electrodes 564r and 564l and the fixed side comb teeth electrodes 574r and 574l do not at all overlap each other. Thus, the capacities between the movable side comb teeth electrodes 564r and 564l and between the fixed side comb teeth electrodes 574r and 574l are both 0.

Furthermore, when the second movable plates 560a and 560b reach the maximum oscillation angle in a clockwise direction, the area of the part where the movable side comb teeth electrode 564r and the fixed side comb teeth electrode 574r will be the maximum, and the capacitance between the movable side comb teeth electrode 564r faces the fixed side comb teeth electrode 574r will be the maximum. Meanwhile, the movable side comb teeth electrode 564l and the fixed side comb teeth electrode 574l are farther away from each other than when the oscillation angle of the second movable plates 560a and 560b is 0, so that the capacitance between them is still 0. On the contrary, when the second movable plates 560a and 560b reach the maximum oscillation angle in a counterclockwise direction, the capacitance between the movable side comb teeth electrode 564l and the fixed side comb teeth electrode 574l will be the maximum.

The capacities between the movable side comb teeth electrodes 564r and 564l and between the fixed side comb teeth electrodes 574r and 574l can be easily expected from the following equation (2).

$$C = \varepsilon_0 \frac{s}{d} \tag{2}$$

Here, C is the capacitance, $\varepsilon_0$ is a relative dielectric constant, S is the area of the facing electrodes, and d is the space between the electrodes. As apparent from the equation (2), the capacitance C increases if the area S of the facing electrodes increases or the space d between the electrodes is reduced, and the capacitance C decreases if the area S of the facing electrodes decreases or the space d between the electrodes expands.

Furthermore, the capacitance-amplitude conversion circuit 594r detects the voltage across the movable side extraction electrode 568 and the fixed side extraction electrode 578r. Similarly, the capacitance-amplitude conversion circuit 594l detects the voltage across the movable side extraction electrode 568 and the fixed side extraction electrode 578l. Detection signals of the capacitance-amplitude conversion circuits 594r and 594l will be the above-mentioned high-frequency voltage signals on which the capacitance changes between the movable side comb teeth electrodes 564r and 564l and between the fixed side comb teeth electrodes 574r and 574l are superposed.

The amplitude detection circuits 596r and 596l only extract signal components corresponding to the capacitance changes between the movable side comb teeth electrodes 564r and 564l and between the fixed side comb teeth electrodes 574r and 574l from the detection signals of the capacitance-amplitude conversion circuits 594r and 594l. The output of the amplitude detection circuit 596r and the output of the amplitude detection circuit 596l are subjected to the subtraction processing by the subtractor 598 and will be final detection signals.

Figure 20:
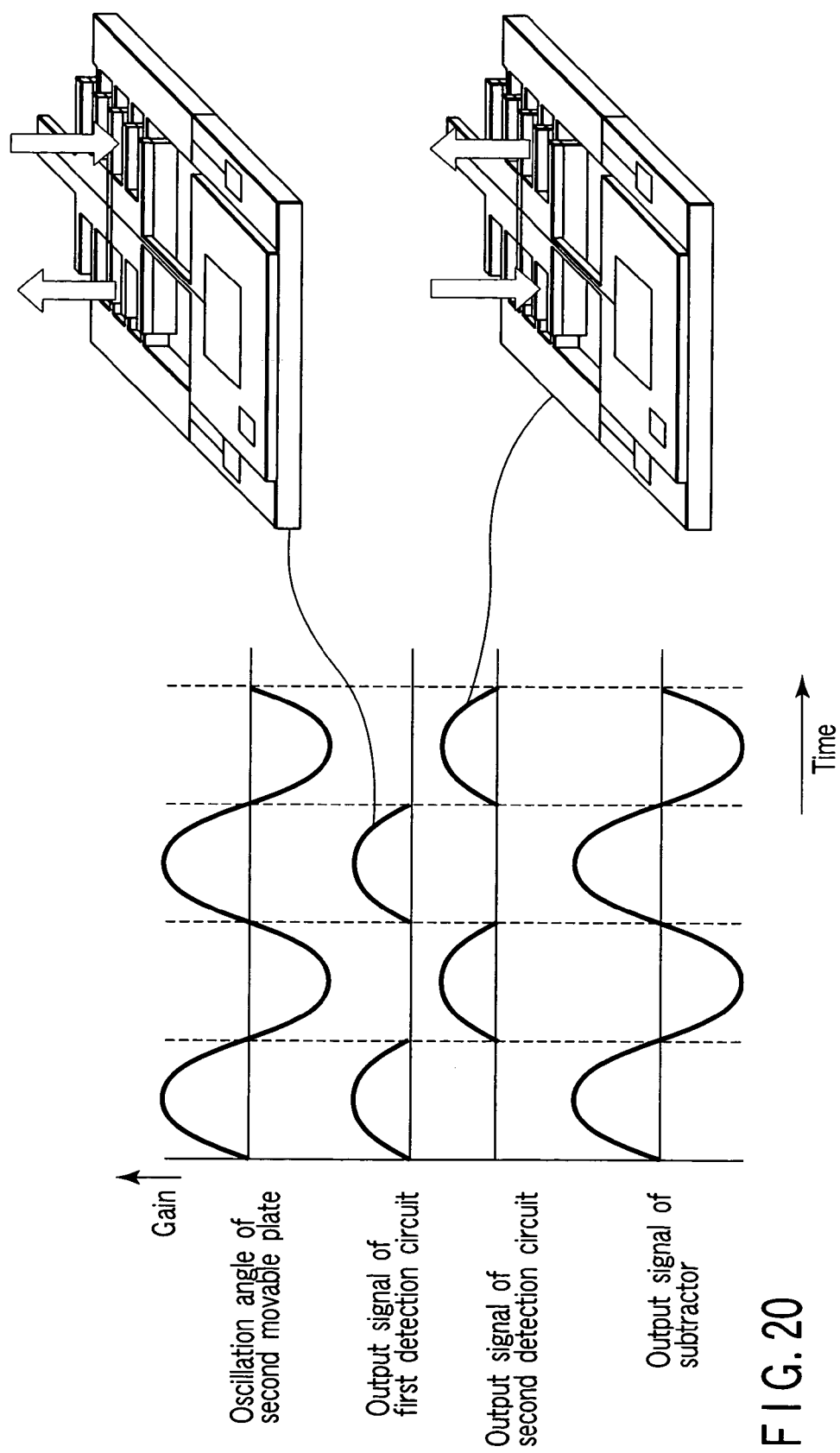
FIG. 20 shows output signals of a first detection circuit, a second detection circuit and a subtractor with regard to the oscillation angle of the second movable plate, in the light deflector according to the fourth modification.

FIG. 20 shows output signals of the first detection circuit 592r, the second detection circuit 592l and the subtractor 598 with regard to the oscillation angle of the second movable plates 560a and 560b. In FIG. 20, the horizontal axis represents time and the vertical axis represents the oscillation angle and gains of the respective signals. The oscillation angle is positive in a clockwise direction and negative in a counterclockwise direction.

As understood from FIG. 20, the output signal emerges in one of the first detection circuit 592r and the second detection circuit 592l depending on the oscillation direction of the second movable plates 560a and 560b, that is, depending on whether the oscillation angle is positive or negative, but the output signal does not emerge in the other one. More specifically, when the second movable plates 560a and 560b oscillate in a clockwise direction, that is, when the oscillation angle is positive, the output signal emerges in the first detection circuit 592r while the output signal does not emerge in the second detection circuit 592l. On the contrary, when the second movable plates 560a and 560b oscillate in a counterclockwise direction, that is, when the oscillation angle is negative, the output signal does not emerge in the first detection circuit 592r while the output signal emerges in the second detection circuit 592l.

The output signal of the subtractor 598 is produced by subtracting the output signal of the second detection circuit 592l from the output signal of the first detection circuit 592r, and changes in phase with the oscillation angle of the second movable plates 560a and 560b. Therefore, it is possible to know the oscillation angle and oscillation direction of the second movable plates 560a and 560b from the output signal of the subtractor 598.

As described above, in the low-speed scanning state, the second movable plates 560a and 560b oscillate in phase with the first movable plate 122. It is therefore possible to know the oscillation angle of the first movable plate 122 on the basis of the output signal of the subtractor 598.

In the high-speed scanning state, a resonant actuation is performed such that the second movable plates 560a and 560b oscillate in opposite phase with the first movable plate 122. Moreover, the oscillation angle of the first movable plate 122 and the oscillation angle of the second movable plates 560a and 560b differ depending on their moment of inertia. It is therefore difficult to predict the oscillation angle of the first movable plate 122 from the oscillation angle of the second movable plates 560a and 560b.

Thus, in the high-speed scanning state, the drive coil 142 may preferably be used to detect the oscillation angle of the first movable plate 122 in accordance with a technique disclosed in U.S. 2003/042801. More specifically, time to supply a drive current to the drive coil 142 and time to detect induced electromotive force produced in the drive coil 142 are set such that the supply of drive current and the detection of the induced electromotive force are alternately repeated. A speed signal of the first movable plate 122 is obtained by the detection of the induced electromotive force, and the signal is integrated to acquire information on the oscillation angle of the first movable plate 122.

As described above, a light deflector 500 in the present modification has the detection function to detect the oscillation angle of the second movable plates 560a and 560b, so that it is possible to know the oscillation angle and oscillation direction of the first movable plate 122 in low-speed scanning state.

While the embodiments of the present invention have so far been described with reference to the drawings, the present invention is not limited to these embodiments, and various modifications and alterations may be made without departing from the spirit thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A light deflector comprising:
a first movable plate having a reflective surface;
fixing portions;
a pair of second movable plates located between the first movable plate and the fixing portions;
a pair of first elastic members supporting the first movable plate so as to allow the first movable plate to oscillate with respect to the second movable plates;
a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and
actuating means for oscillating the first movable plate;
wherein a total moment of inertia about the oscillation axis of the pair of second movable plates is equal to or greater than a moment of inertia about an oscillation axis of the first movable plate.

2. A light deflector comprising:
a first movable plate having a reflective surface;
fixing portions;
a pair of second movable plates located between the first movable plate and the fixing portions;
a pair of first elastic members supporting the first movable plate so as to allow the first movable plate to oscillate with respect to the second movable plates;
a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and
actuating means for oscillating the first movable plate;
wherein the fixing portions, the first movable plate, the second movable plates, the first elastic members and the second elastic members are formed from the same silicon substrate; the first elastic members and the second elastic members have about the same thickness; the fixing portions, the first movable plate and the second movable plates have about the same thickness; the thickness of the first elastic members and the second elastic members is smaller than the thickness of the fixing portions, the first movable plate and the second movable plates; and the width of the first elastic members is greater than the width of the second elastic members.

3. A light deflector comprising:
a first movable plate having a reflective surface;
fixing portions;
a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and actuating means for oscillating the first movable plate;

wherein the fixing portions, the first movable plate, the second movable plates, the first elastic members and the second elastic members are formed from the same silicon substrate; the first elastic members and the second elastic members have about the same thickness; the fixing portions, the first movable plate and the second movable plates have about the same thickness; the thickness of the first elastic members and the second elastic members is smaller than the thickness of the fixing portions, the first movable plate and the second movable plates; and the length dimension along the oscillation axis of the first elastic members is shorter than the length dimension along the oscillation axis of the second elastic members.

4. The light deflector according to claim 3, wherein the width of the first elastic members is greater than the width of the second elastic members.

5. A light deflector comprising:

a first movable plate having a reflective surface;

fixing portions;

a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and actuating means for oscillating the first movable plate;

wherein the actuating means comprises a drive coil provided in the first movable plate, and a magnetic field generator for generating a magnetic field crossing the first movable plate and the actuating means further comprises drive coils provided in the second movable plates, and the magnetic field generator generates a magnetic field crossing the second movable plates as well as the first movable plate.

6. A light deflector comprising:

a first movable plate having a reflective surface;

fixing portions;

a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and actuating means for oscillating the first movable plate;

wherein the actuating means comprises an electrode provided in the first movable plate, and electrodes disposed to face the electrode of the first movable plate and the actuating means further comprises electrodes provided in the second movable plates, and electrodes disposed to face the electrode provided in the first movable plate.

7. A light deflector comprising:

a first movable plate having a reflective surface;

fixing portions;

a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation;

actuating means for oscillating the first movable plate; and detecting means for detecting an oscillation angle of the second movable plates to the fixing portions;

wherein the detecting means includes first electrodes provided in the second movable plates, and second electrodes provided to extend from the fixing portions, the second electrodes facing the first electrodes, and the oscillation angle of the second movable plates is detected from a capacitance change caused between the first electrodes and the second electrodes.

8. A light deflector comprising:

a first movable plate having a reflective surface;

fixing portions;

a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and an actuator to oscillate the first movable plate;

wherein a total moment of inertia about the oscillation axis of the pair of second movable plates is equal to or greater than a moment of inertia about an oscillation axis of the first movable plate.

9. A light deflector comprising:

a first movable plate having a reflective surface;

fixing portions;

a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and an actuator to oscillate the first movable plate;

wherein the fixing portions, the first movable plate, the second movable plates, the first elastic members and the second elastic members are formed from the same silicon substrate; the first elastic members and the second elastic members have about the same thickness; the fixing portions, the first movable plate and the second movable plates have about the same thickness; the thickness of the first elastic members and the second elastic members is smaller than the thickness of the fixing portions, the first movable plate and the second movable plates; and the width of the first elastic members is greater than the width of the second elastic members.

10. A light deflector comprising:

a first movable plate having a reflective surface;

fixing portions;

a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and an actuator to oscillate the first movable plate;

wherein the fixing portions, the first movable plate, the second movable plates, the first elastic members and the second elastic members are formed from the same silicon substrate; the first elastic members and the second elastic members have about the same thickness; the fixing portions, the first movable plate and the second movable plates have about the same thickness; the thickness of the first elastic members and the second elastic members is smaller than the thickness of the fixing portions, the first movable plate and the second movable plates; and the length dimension along the oscillation axis of the first elastic members is shorter than the length dimension along the oscillation axis of the second elastic members.

11. The light deflector according to claim 10, wherein the width of the first elastic members is greater than the width of the second elastic members.

12. A light deflector comprising:

a first movable plate having a reflective surface;

fixing portions;

a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and an actuator to oscillate the first movable plate;

wherein the actuator comprises a drive coil provided in the first movable plate, and a magnetic field generator which generates a magnetic field crossing the first movable plate and the actuator further comprises drive coils provided in the second movable plates, and the magnetic field generator generates a magnetic field crossing the second movable plates as well as the first movable plate.

13. A light deflector comprising:

a first movable plate having a reflective surface;

fixing portions;

a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation; and an actuator to oscillate the first movable plate;

wherein the actuator comprises an electrode provided in the first movable plate, and electrodes disposed to face the electrode of the first movable plate and the actuator further comprises electrodes provided in the second movable plates, and electrodes disposed to face the electrode provided in the first movable plate.

14. A light deflector comprising:

a first movable plate having a reflective surface;

fixing portions;

a pair of second movable plates located between the first movable plate and the fixing portions;

a pair of first elastic members supporting the first movable plate so as to allow the first movable plate to oscillate with respect to the second movable plates;

a pair of second elastic members supporting the second movable plates so as to allow the second movable plates to oscillate with respect to the fixing portions, oscillation axis of the first elastic members and oscillation axis of the second elastic members being located on the same axis, and stiffness of the second elastic members against oscillation being lower than stiffness of the first elastic members against oscillation;

an actuator to oscillate the first movable plate; and a detector to detect an oscillation angle of the second movable plates to the fixing portions;

wherein the detector includes first electrodes provided in the second movable plates, and second electrodes provided to extend from the fixing portions, the second electrodes facing the first electrodes, and the oscillation angle of the second movable plates is detected from a capacitance change caused between the first electrodes and the second electrodes.

* * * * *